United States Patent
Barkman et al.

(10) Patent No.: US 10,838,599 B2
(45) Date of Patent: Nov. 17, 2020

(54) CUSTOM MEDIA OVERLAY SYSTEM

(71) Applicant: Snap Inc., Santa Monica, CA (US)

(72) Inventors: Brent Michael Barkman, Los Angeles, CA (US); Michael Cumberbatch, Culver City, CA (US); Zachary Lupei, Los Angeles, CA (US); Ashley Michelle Wayne, Los Angeles, CA (US); Eric Wood, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/798,111

(22) Filed: Feb. 21, 2020

(65) Prior Publication Data

US 2020/0272306 A1 Aug. 27, 2020

Related U.S. Application Data

(60) Provisional application No. 62/810,085, filed on Feb. 25, 2019.

(51) Int. Cl.
*G06F 3/0484* (2013.01)
*G06F 3/14* (2006.01)
*G06T 11/60* (2006.01)

(52) U.S. Cl.
CPC ...... *G06F 3/04842* (2013.01); *G06F 3/04847* (2013.01); *G06F 3/14* (2013.01); *G06T 11/60* (2013.01)

(58) Field of Classification Search
None
See application file for complete search history.

(56) References Cited

U.S. PATENT DOCUMENTS

| 2013/0314398 A1* | 11/2013 | Coates | G09G 5/14 345/419 |
| 2014/0129948 A1* | 5/2014 | Jones | G06F 3/048 715/733 |

(Continued)

FOREIGN PATENT DOCUMENTS

WO 2014011169 1/2014

OTHER PUBLICATIONS

"International Application Serial No. PCT/US2020/019605, International Search Report dated Jun. 9, 2020", 3 pgs.

(Continued)

*Primary Examiner* — Toan H Vu
(74) *Attorney, Agent, or Firm* — Schwegman Lundberg & Woessner, P.A.

(57) ABSTRACT

Systems and methods are provided for receiving a request to generate a media overlay corresponding to a home of a first user, and for generating the media overlay corresponding to the home of the first user using media content received in the request. The systems and methods further provide for associating, with the media overlay, a location of the home of the first user and a selection of users to grant permission to access the media overlay corresponding to the home of the first user. The systems and methods further provide for determining whether a second user and a location corresponding to the second computing device trigger access to the media overlay and providing the media overlay to the second computing device, based on determining that the second user and location corresponding to the second computing device trigger access to the media overlay.

20 Claims, 18 Drawing Sheets

(56) References Cited

U.S. PATENT DOCUMENTS

| | | | |
|---|---|---|---|
| 2016/0050368 A1* | 2/2016 | Seo | H04N 5/144 |
| | | | 348/36 |
| 2018/0025219 A1 | 1/2018 | Baldwin et al. | |
| 2018/0058875 A1* | 3/2018 | Wan | G01C 21/3484 |
| 2018/0189925 A1* | 7/2018 | Lee | G06T 1/60 |
| 2018/0335936 A1* | 11/2018 | Missig | G06F 3/0482 |
| 2019/0385373 A1* | 12/2019 | Mittleman | G06T 19/006 |
| 2020/0080865 A1* | 3/2020 | Ervin | H04W 4/33 |

OTHER PUBLICATIONS

"International Application Serial No. PCT/US2020/019605, Written Opinion dated Jun. 9, 2020", 9 pgs.

\* cited by examiner

US 10,838,599 B2

CUSTOM MEDIA OVERLAY SYSTEM

PRIORITY

This application claims the benefit of priority of U.S. Patent Application No. 62/810,085, filed Feb. 25, 2019, which is hereby incorporated by reference herein in its entirety.

BACKGROUND

A content sharing platform may receive millions of messages from users desiring to share media content such as audio, images, and video between user devices (e.g., mobile devices, personal computers, etc.). The media content of these messages may be associated with a common geolocation, a common time period, a common event, and so forth. Often, a user sends messages to users in his or her social network and can view profile data for users only in his or her social network.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to a custom media overlay system. For example, example embodiments allow a user to create a custom media overlay for his or her home that can be used by designated friends (e.g., to augment images or videos captured by the friends) when they are visiting the user's home. The custom media overlay is customizable with templates and creative tools and can be updated as often as the user wants. In some examples, templates, stickers, and other creative content can be updated seasonally (e.g., snowy home illustrations in winter, sunny themes in the summer, American flags on the lawn in July, etc.). Users can also use the custom media overlay for one-off events they host like a party or game night. Since a home is a private space, designated users that have permission to access such custom media overlays can be limited to users (e.g., friends) that have a bi-directional connection with the first user in a social networking system.

For example, a server system (e.g., a server system in a messaging system) receives a request to generate a media overlay corresponding to a home of a first user. The request may comprise media content to be included in a custom media overlay. For example, the media content may include creative content that will be included in the custom media overlay corresponding to the home of the first user. The server system generates the media overlay, using the received content, and associates a location of the home of the first user and a selection of users to grant permission to access the custom media overlay, with the custom media overlay. The server system stores the custom media overlay and allows it to be accessed by the selection of users when they are located in or near the home of the first user.

For example, the server system receives location information corresponding to a second computing device, determines a second user corresponding to the second computing device, and determines whether the second user and the location information of the second computing device trigger access to the stored custom media overlay. If so, the server system provides the custom media overlay to the second computing device. The second user can then use the custom media overlay to augment images or video captured in the first user's home and send the augmented images or video to other users.

Figure 1:
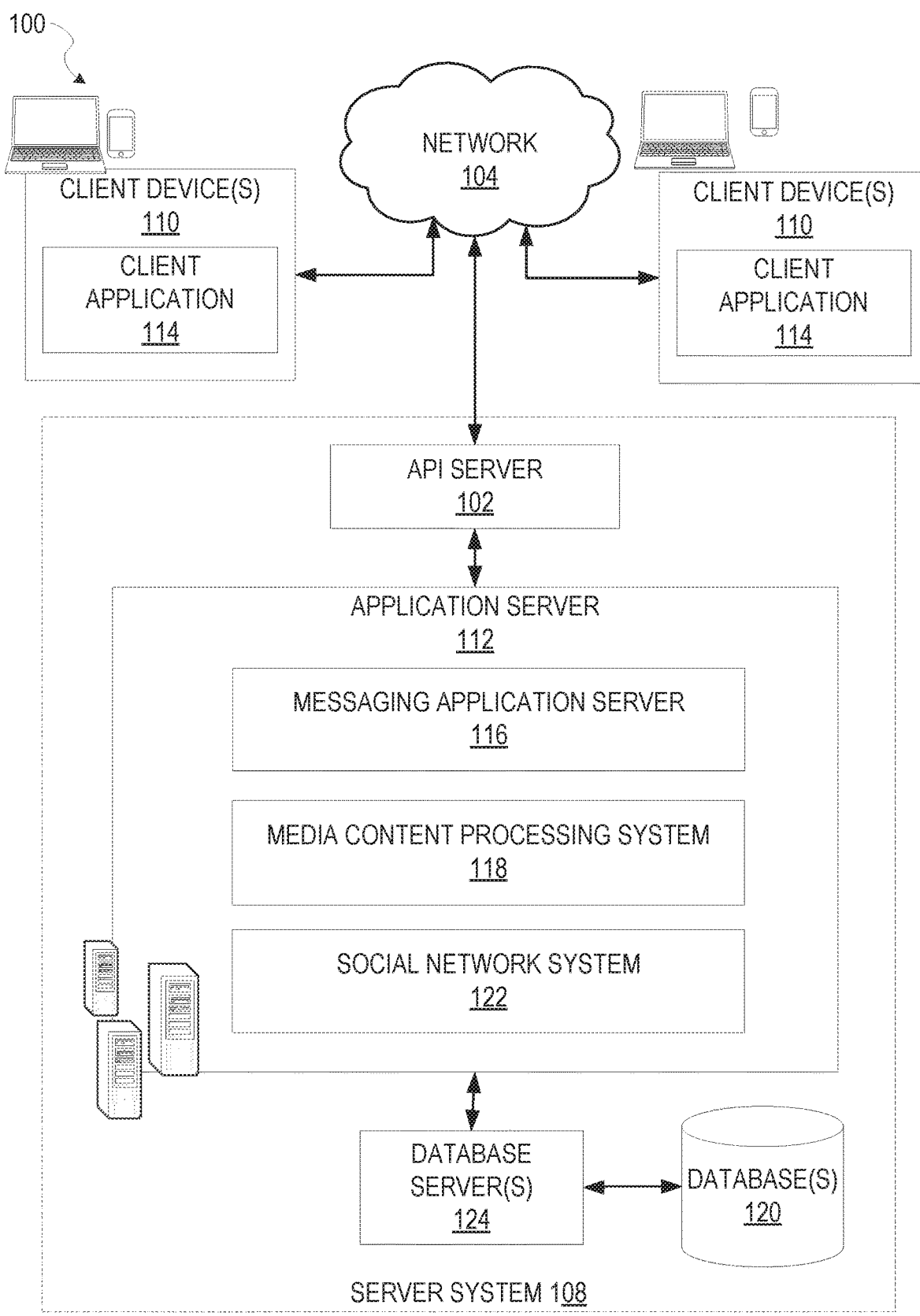
FIG. 1 is a block diagram showing an example networked system for exchanging data (e.g., messages and associated content) over a network, according to some example embodiments.

FIG. 1 is a block diagram illustrating a networked system 100 (e.g., a content sharing platform or messaging system) for exchanging data (e.g., messages and associated content) over a network. The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth.

The client device 110 may be a device of a user that is used to create media content items such as video, images (e.g., photographs), audio, and media overlays and to send and receive messages containing such media content items, text, media overlays, and so forth, to and from other users. The client device 110 may be a device of a user that is used to create and edit media overlays, view and generate interactive messages, view other users on a map, and so forth.

One or more users may be a person, a machine, or other means of interacting with the client device 110. In example embodiments, the user may not be part of the system 100 but may interact with the system 100 via the client device 110 or other means. For instance, the user may provide input (e.g., touch screen input or alphanumeric input) to the client device 110, and the input may be communicated to other entities in the system 100 (e.g., third-party servers, the server system 108, etc.) via the network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, and the like.

In some embodiments, one or more client applications 114 may be included in a given one of the client devices 110, and configured to locally provide a user interface and at least some of the functionalities of the application, with the client application 114 configured to communicate with other entities in the system 100 (e.g., third-party servers, the server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third-party servers, the server system 108, etc.).

In one example, a client application 114 may be a messaging application that allows a user to take a photograph or video, add a caption or otherwise edit the photograph or video, and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched or joined together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection. A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

In another example, the messaging application may allow a first user to create a media overlay corresponding to a home of the first user. The media overlay is associated with a location of the home of the first user and a selection of users to grant permission to access the media overlay. When a second user, who has permission to access the media overlay corresponding to the home of the first user, is in the home of the first user, the second user can access the media overlay to augment images (e.g., photographs) or video captured by a computing device of the second user. The second user can send the images or video augmented by the media overlay to one or more other users.

The server system 108 may provide server-side functionality via the network 104 (e.g., the Internet or a wide area network (WAN)) to one or more client devices 110 and/or one or more third-party servers (not shown). The server system 108 may include an application programming interface (API) server 102, an application server 112, a messaging application server 116, a media content processing system 118, and a social network system 122, which may be communicatively coupled with each other and with one or more data storages, such as one or more databases 120.

The server system 108 may be a cloud computing environment, according to some example embodiments. The server system 108, and any servers associated with the server system 108, may be associated with a cloud-based application, in one example embodiment.

The one or more databases 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., a computing or client device 110), media overlays, media overlay smart widgets or smart elements, user data, user device information, media content (e.g., video and images), media content data (e.g., data associated with video and images), computing device context data, serialized data, session data items, user device location data, mapping information, chance mode data, interactive message usage data, interactive message metrics data, and so forth. The one or more databases 120 may further store information related to third-party servers, third-party applications, client devices 110, client applications 114, users, and so forth.

The one or more databases 120 may include cloud-based storage external to the server system 108 (e.g., hosted by one or more third-party entities external to the server system 108). While the storage devices are shown as database(s) 120, it is to be understood that the system 100 may access and store data in storage devices such as databases 120, blob storages, and other types of storage methods.

The system 100 may further include one or more third-party servers (not shown). The one or more third-party servers may include one or more third-party applications. The one or more third-party applications, executing on the third-party server(s), may interact with the server system 108 via the API server 102 via a programmatic interface provided by the API server 102. For example, one or more of the third-party applications may request and utilize information from the server system 108 via the API server 102 to support one or more features or functions on a website hosted by a third party or an application hosted by the third party. The third-party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed either by a client application 114 or by the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), media content data (e.g., data associated with video and images), interactive message usage data, and chance mode data, as examples. Data exchanges within the networked system 100 are invoked and controlled through functions available via user interfaces (UIs) of the client application 114.

In the server system 108, the API server 102 is coupled to, and provides a programmatic interface to, the application server 112. The application server 112 is communicatively coupled to a database server 124, which facilitates access to the one or more databases 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of such collections; the retrieval of a list of friends of a user of a client device 110; the retrieval of messages and content; the adding of friends to and deletion of friends from a social graph; the location of friends within a social graph; opening an application event (e.g., relating to the client application 114); mapping data; the creation and generation of a media overlay, and so forth.

The application server 112 hosts a number of applications and subsystems, including the messaging application server 116, the media content processing system 118, and the social network system 122. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor- and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., the database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 304 (depicted in FIG. 3) within the database(s) 120. Examples of functions and services supported by the social network system 122 include the identification of other users of the networked system 100 with whom a particular user has relationships or whom the particular user is "following," and also the identification of other entities and interests of a particular user. The social network system 122 also maintains chance mode geofences and indexes of user locations related to chance mode.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 2:
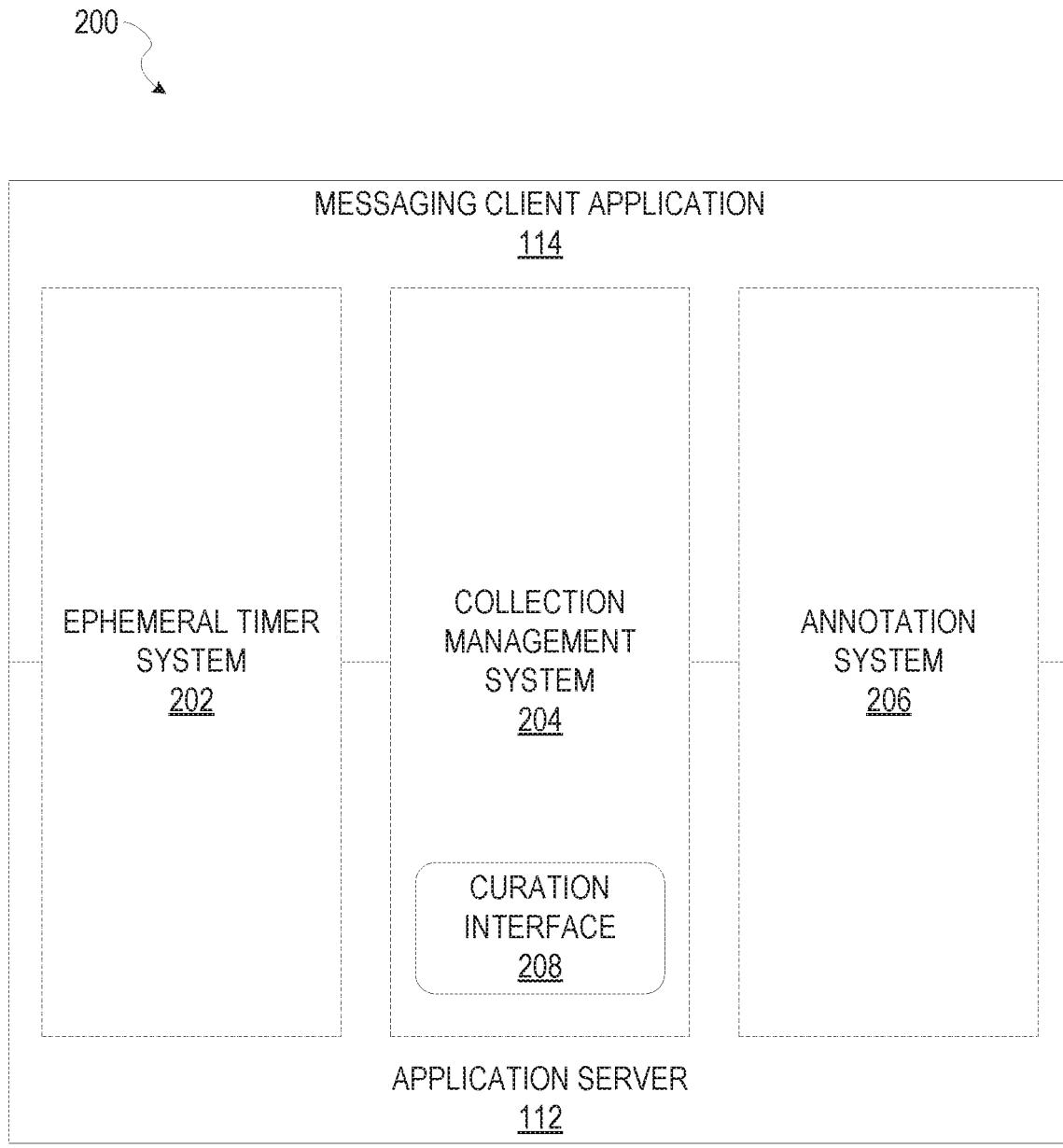
FIG. 2 is a block diagram illustrating further details regarding the messaging system, according to some example embodiments.

FIG. 2 is a block diagram 200 illustrating further details regarding the system 100, according to example embodiments. Specifically, the system 200 is shown to comprise the messaging client application 114 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 114 and the messaging application server 116. To this end, the ephemeral timer system 202 incorporates a number of timers that, based on duration and display parameters associated with a message, a collection of messages (e.g., otherwise referred to herein as "media collections," "galleries," "message collections," "stories," and the like), or a chat in chance mode, selectively display and enable access to messages and associated content via the messaging client application 114.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 114.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g., money, non-money credits or points associated with the messaging system or a third-party reward system, travel miles, access to artwork or specialized lenses, etc.) may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. In one example, the annotation system 206 operatively supplies a media overlay (e.g., a filter or media augmentation) to the messaging client application 114 based on a geolocation of the client device 110. In another example, the annotation system 206 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice Beach), a name of a live event, a name of a merchant overlay (e.g., Beach Coffee House), or of a home of a user. In another example, the annotation system 206 uses the geolocation of the client device 110 to identify a media overlay that includes the name of a merchant at the geolocation of the client device 110. The media overlay may include other indicia associated with the merchant. The media overlays may be stored in the database(s) 120 and accessed through the database server 124.

The annotation system 206 may further enable a user to interact with an interactive message, such as by adding one or more media content items to the interactive message, as described in further detail below. In one example embodiment, the annotation system 206 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message.

In one example embodiment, the annotation system 206 provides a user-based publication platform that enables users to select a geolocation on a map, and upload content associated with the selected geolocation. The user may also specify circumstances under which a particular media overlay is to be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
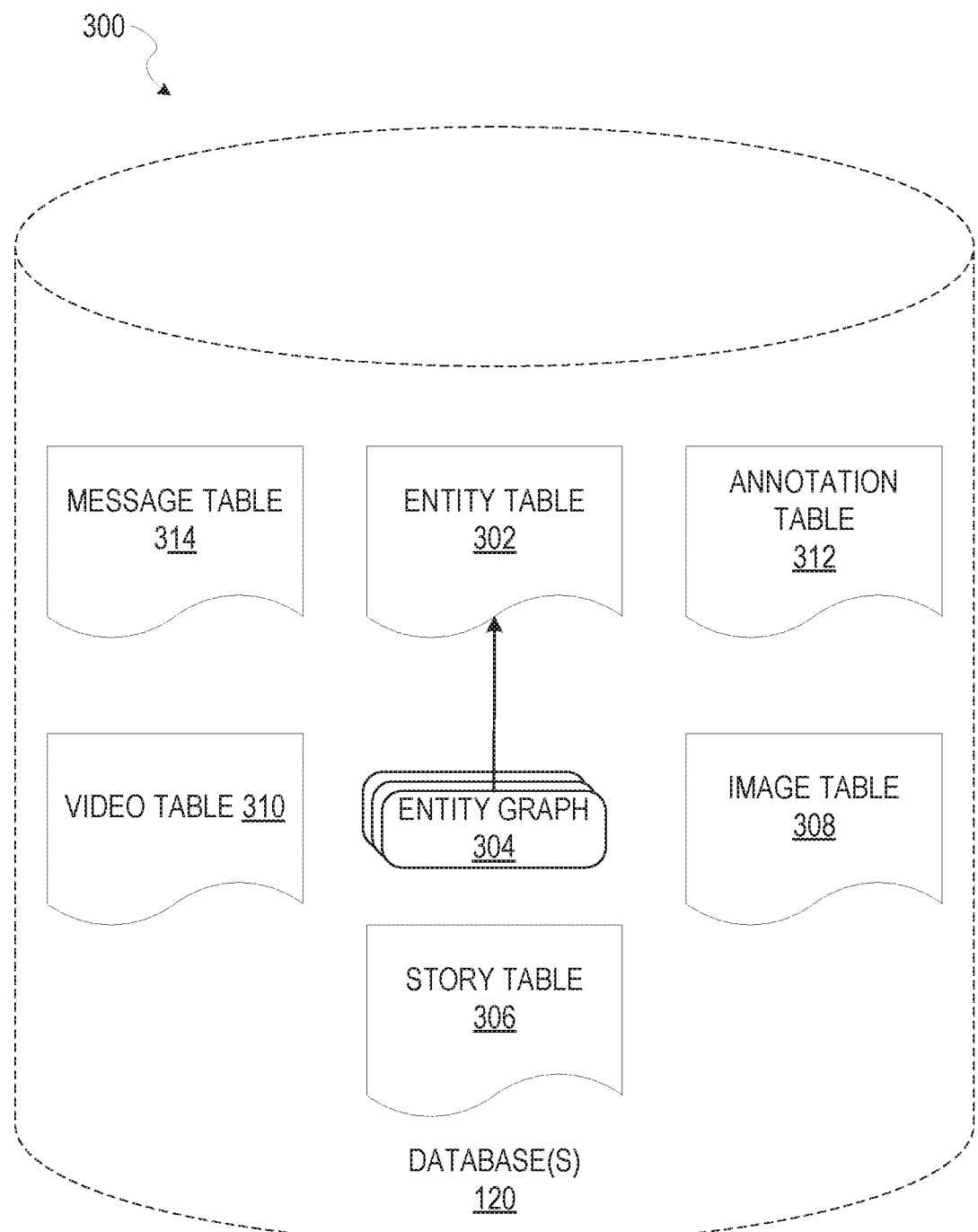
FIG. 3 is a schematic diagram illustrating data which may be stored in a database of a messaging server system, according to some example embodiments.

FIG. 3 is a schematic diagram 300 illustrating data which may be stored in the database(s) 120 of the server system 108, according to certain example embodiments. While the content of the database(s) 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social professional (e.g., work at a common corporation or organization), interested-based, or activity-based, merely for example.

The database 120 also stores annotation data, in the example form of media overlays or filters, in an annotation table 312. Annotation data may also be referred to herein as "creative tools" or "interactive features." Annotation data may comprise predefined interactive messages to be provided to users.

Media overlays or filters, for which data is stored within the annotation table 312, are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as "geo-filters"), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 312 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story." which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
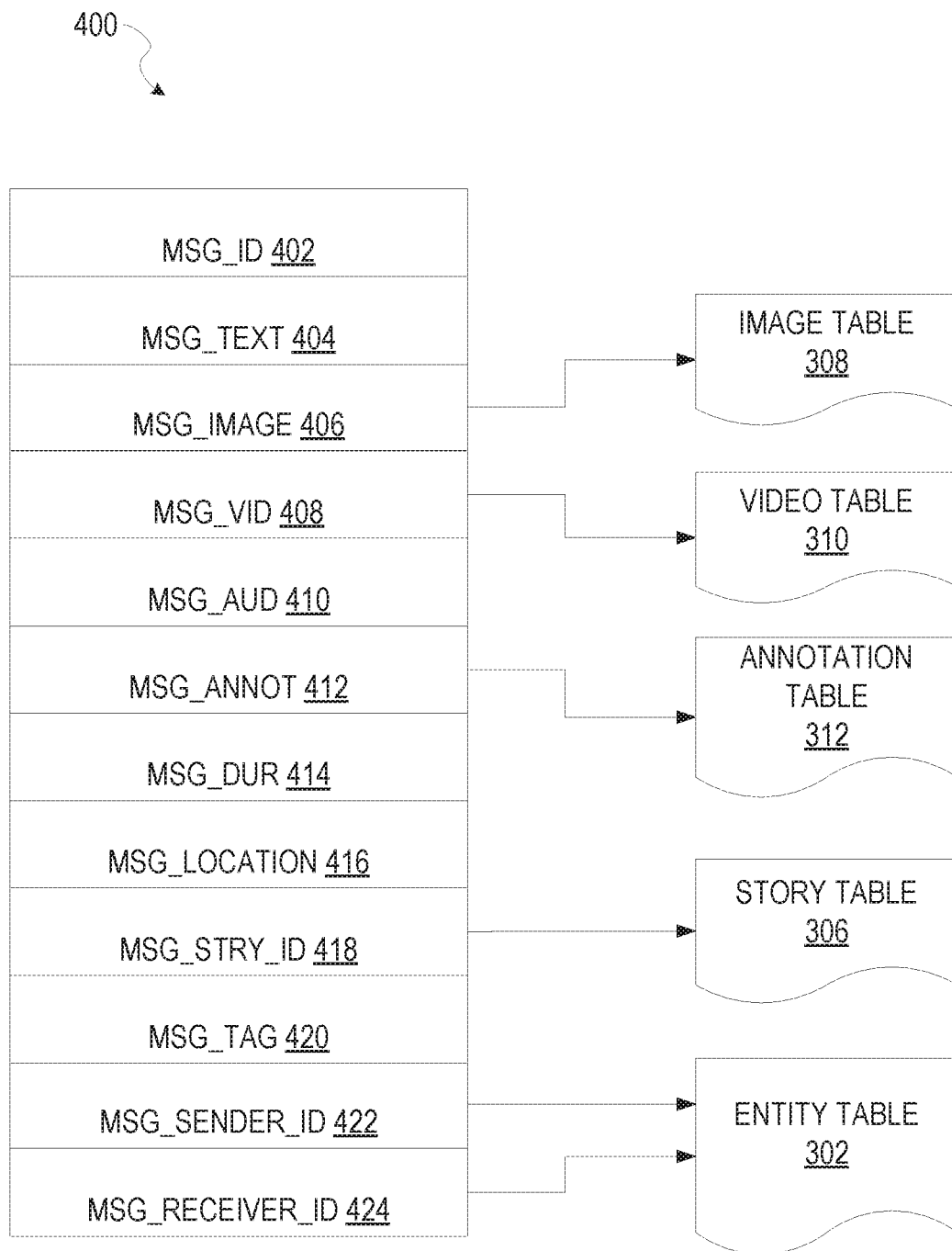
FIG. 4 is a schematic diagram illustrating a structure of a message, according to some embodiments, generated by a messaging client application for communication.

FIG. 4 is a schematic diagram illustrating a structure of a message 400, according to some embodiments, generated by a client application 114 for communication to a further client application 114 or the messaging application server 116. The content of a particular message 400 is used to populate the message table 314 stored within the database(s) 120, accessible by the messaging application server 116. Similarly, the content of a message 400 is stored in memory as "in-transit" or "in-flight" data of the client device 110 or the application server 112. The message 400 is shown to include the following components:

A message identifier 402: a unique identifier that identifies the message 400.

A message text payload 404: text, to be generated by a user via a user interface of the client device 110 and that is included in the message 400.

A message image payload 406: image data, captured by a camera component of a client device 110 or retrieved from memory of a client device 110, and that is included in the message 400.

A message video payload 408: video data, captured by a camera component or retrieved from a memory component of the client device 110 and that is included in the message 400.

A message audio payload 410: audio data, captured by a microphone or retrieved from the memory component of the client device 110, and that is included in the message 400.

Message annotations 412: annotation data (e.g., media overlays such as filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 114.

A message geolocation parameter 416: geolocation data (e.g., latitudinal and longitudinal coordinates) associated with the content payload of the message 400. Multiple message geolocation parameter 416 values may be included in the payload, each of these parameter values being associated with respective content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 110 on which the message 400 was generated and from which the message 400 was sent.

A message receiver identifier 424: an identifier (e.g., a messaging system identifier, email address, or device identifier) indicative of a user of the client device 110 to which the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
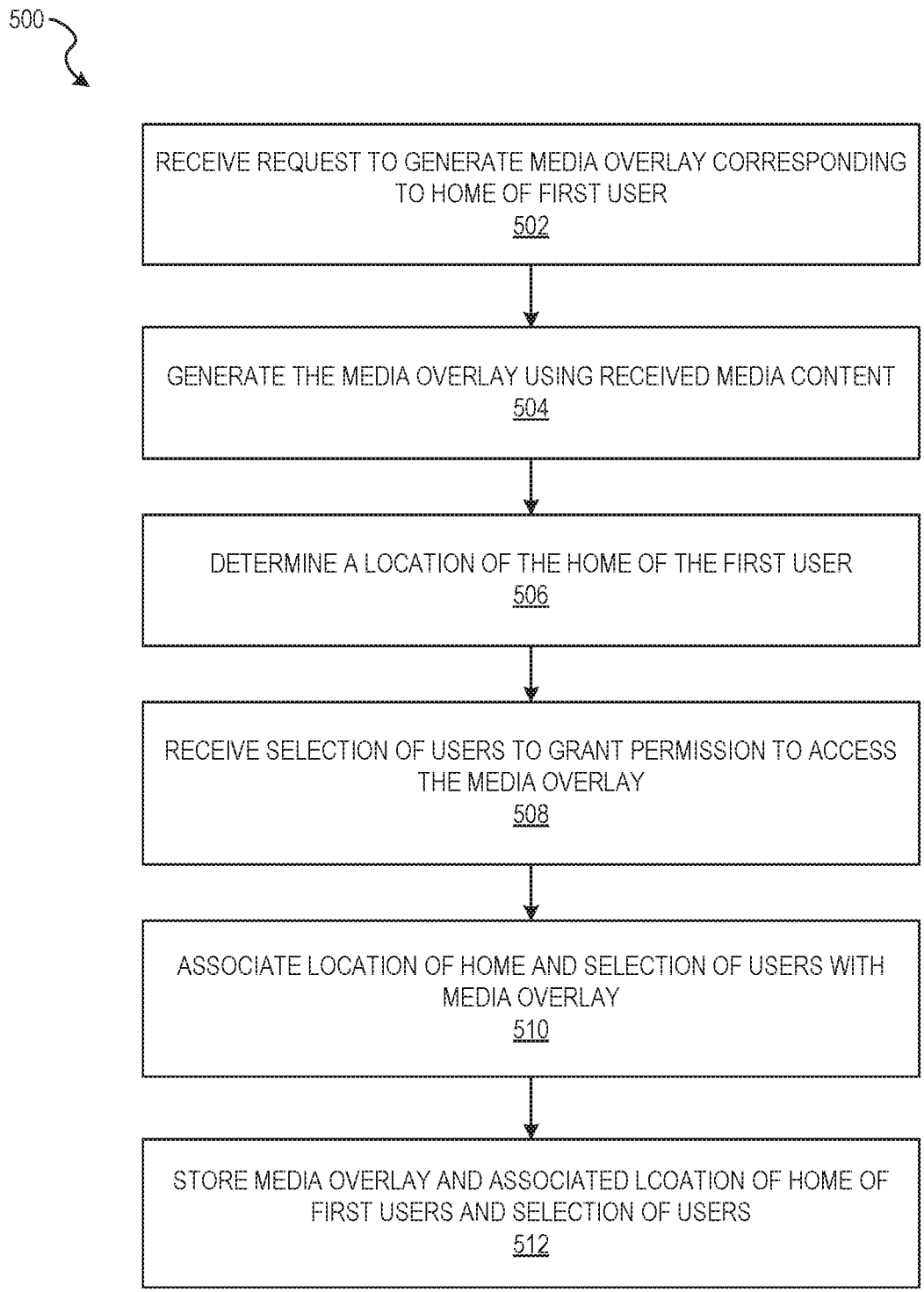
FIG. 5 is a flow chart illustrating aspects of a method, according to some example embodiments.

FIG. 5 is a flow chart illustrating aspects of a method 500, for a custom media overlay system, according to some example embodiments. For illustrative purposes, the method 500 is described with respect to the networked system 100 of FIG. 1. It is to be understood that the method 500 may be practiced with other system configurations in other embodiments.

In operation 502, a server system (e.g., server system 108, application server 112, media content processing system 118, etc.) receives, from a first computing device, a request to generate a media overlay corresponding to a home of a first user (also referred to herein as a "home media overlay" or a "custom media overlay"). In one example, the request comprises media content to be included in the media overlay. For example, media content may comprise a creative with graphics related to the home of the first user, a bitmoji or avatar corresponding to the user, a bitmoji or avatar corresponding to another user currently located in the home of the first user, a graphic corresponding to a pet of the first user, and so forth.

For example, the first user may be using a messaging application on a first computing device and may wish to create a media overlay for his home so that whenever any of his friends or family come to visit, the friends or family can access the media overlay for his home to use to augment images or video generated by their own personal computing devices. For example, the friends or family may wish to send a message to one or more other users indicating that they are hanging out in "Zach's house." The message may comprise an image or video augmented by the first user's (Zach's) home media overlay.

Figure 6:
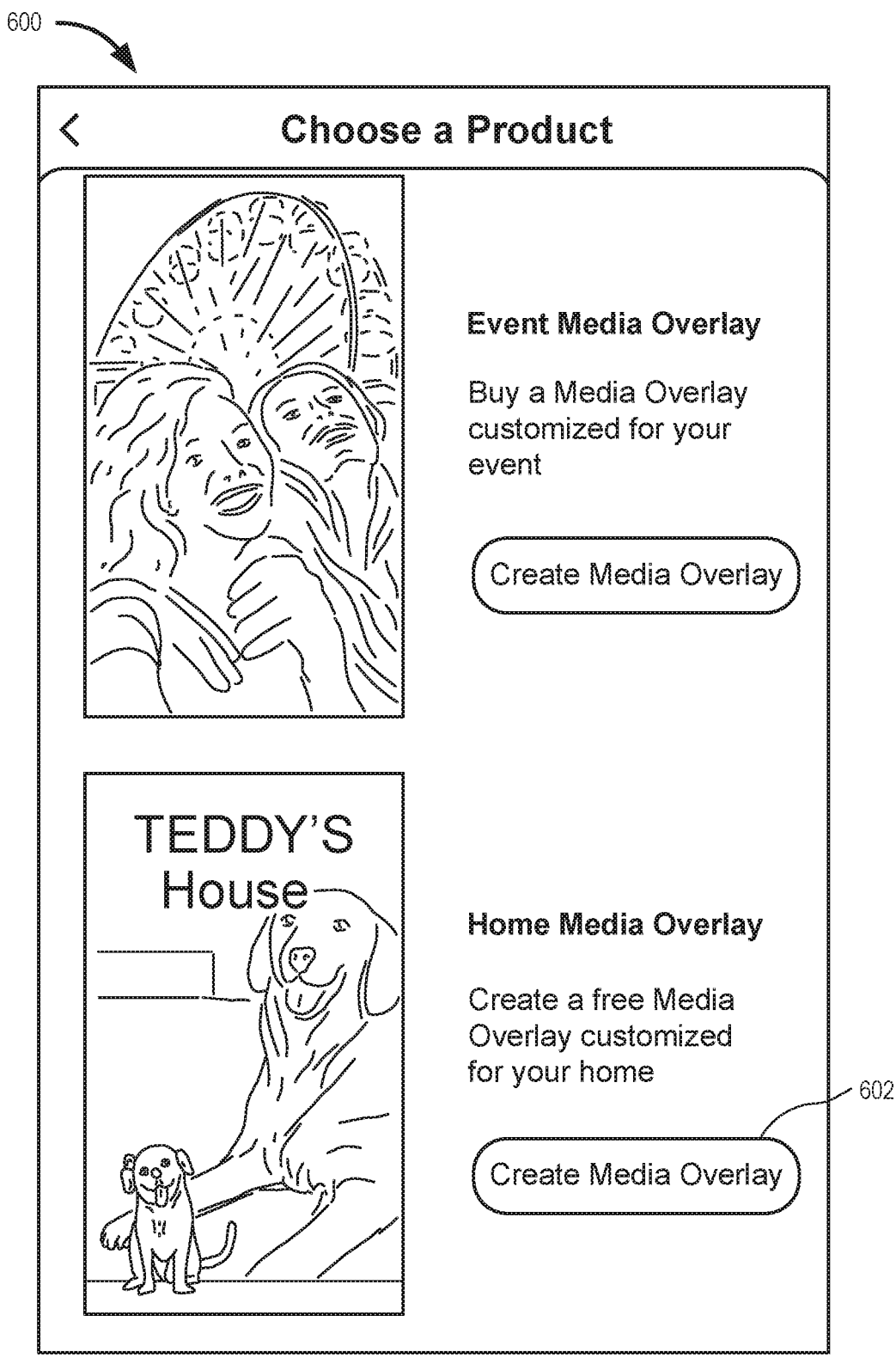
FIGS. 6-14 illustrate example graphical user interfaces, according to some example embodiments.

In one example, the first user accesses the messaging application via the first computing device to choose to create a home media overlay (e.g., filter). For example, the first computing device provides and displays one or more graphical user interfaces to allow the first user to create a home media overlay, as shown in FIG. 6. FIG. 6 illustrates an example graphical user interface (GUI) 600 displayed on a computing device that allows a user to create a media overlay via a "create home media overlay" button 602.

Figure 7:
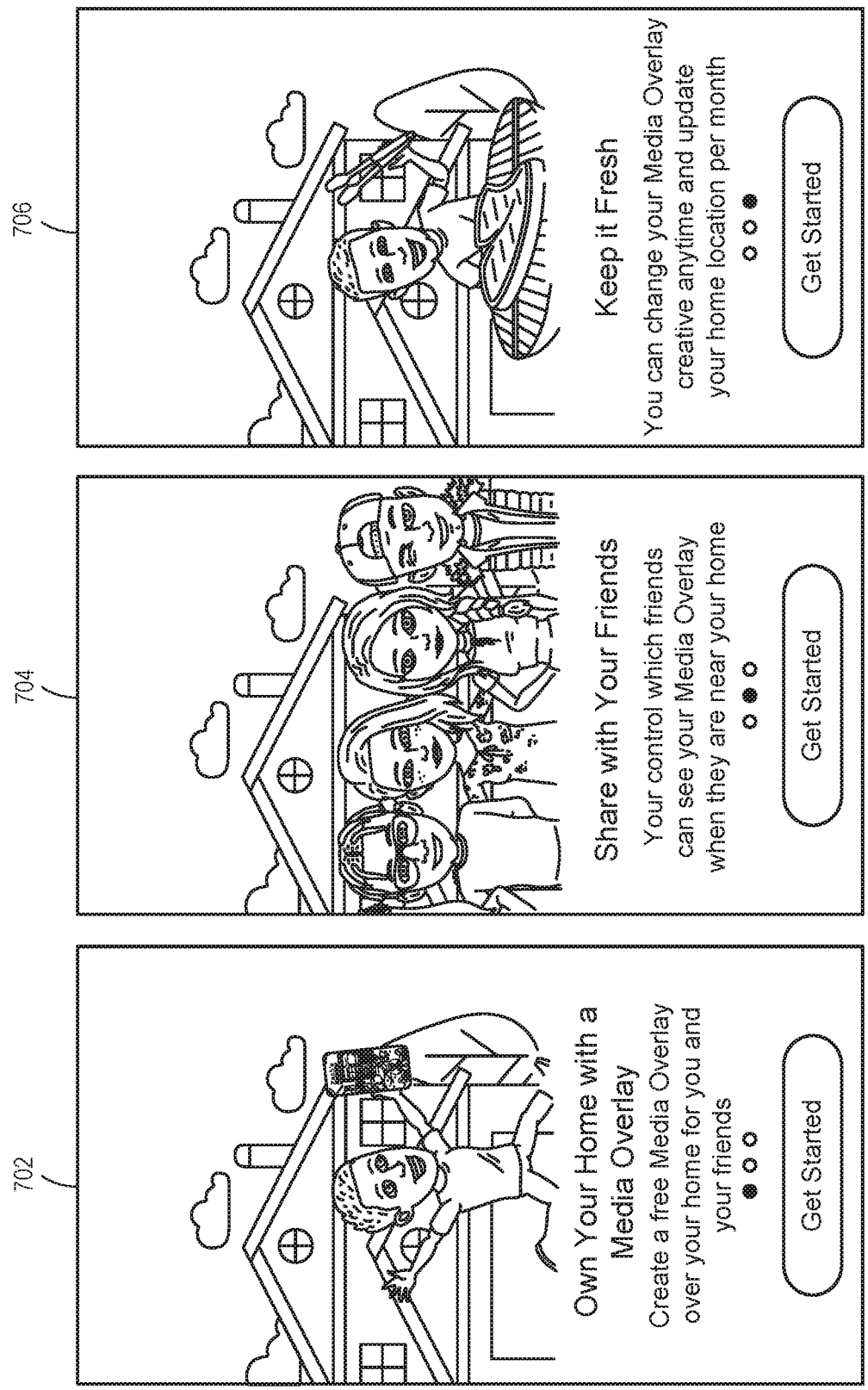

Upon selection of the button 602, the first user accesses further functionality related to creating a home media overlay, as shown in FIG. 7. FIG. 7 illustrates several GUIs 702-706 that can be provided to and displayed by a computing device to access functionality related to creating a home media overlay. For example, GUI 702 allows a user to generate a home media overlay, GUI 704 allows the user to share the home media overlay with friends, and GUI 706 allows the user to change the media overlay and related settings.

Figure 8:
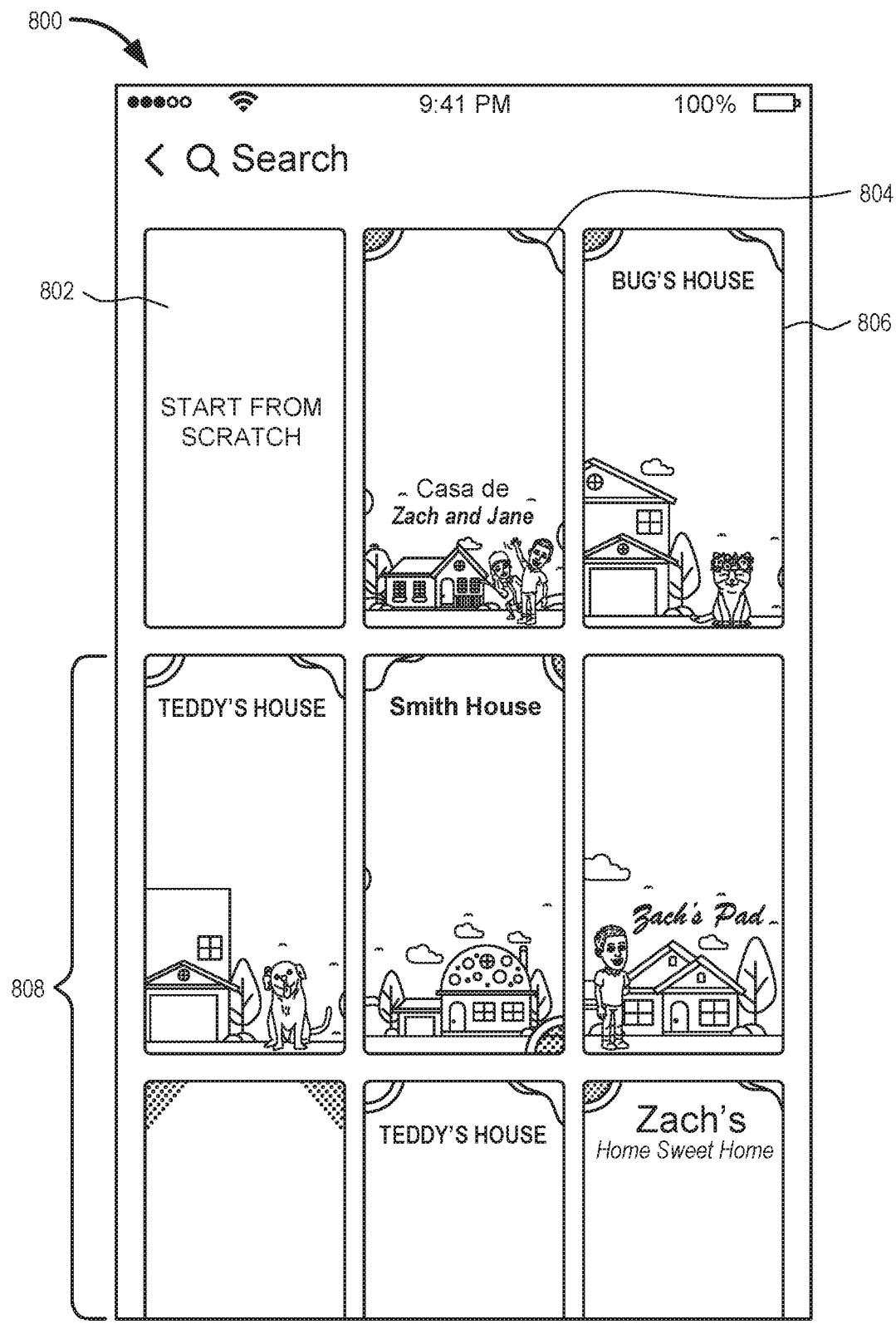

Upon selection in the GUI 702 to create a home media overlay, the computing device displays a plurality of templates for the user to choose from to start creating the home media overlay, or an option to start creating the home media overlay from scratch. FIG. 8 illustrates an example GUI 800 that can be provided to and displayed by a computing device to allow a user to select a template from a plurality of templates 804-808 or to select an option 802 to start from scratch to create a home media overlay. If the user chooses one of the templates 804-808, the computing device (or server system) receives the selection of the one template of the plurality of templates and causes display of the one template and optionally creative tools for editing the one template.

Figure 9:
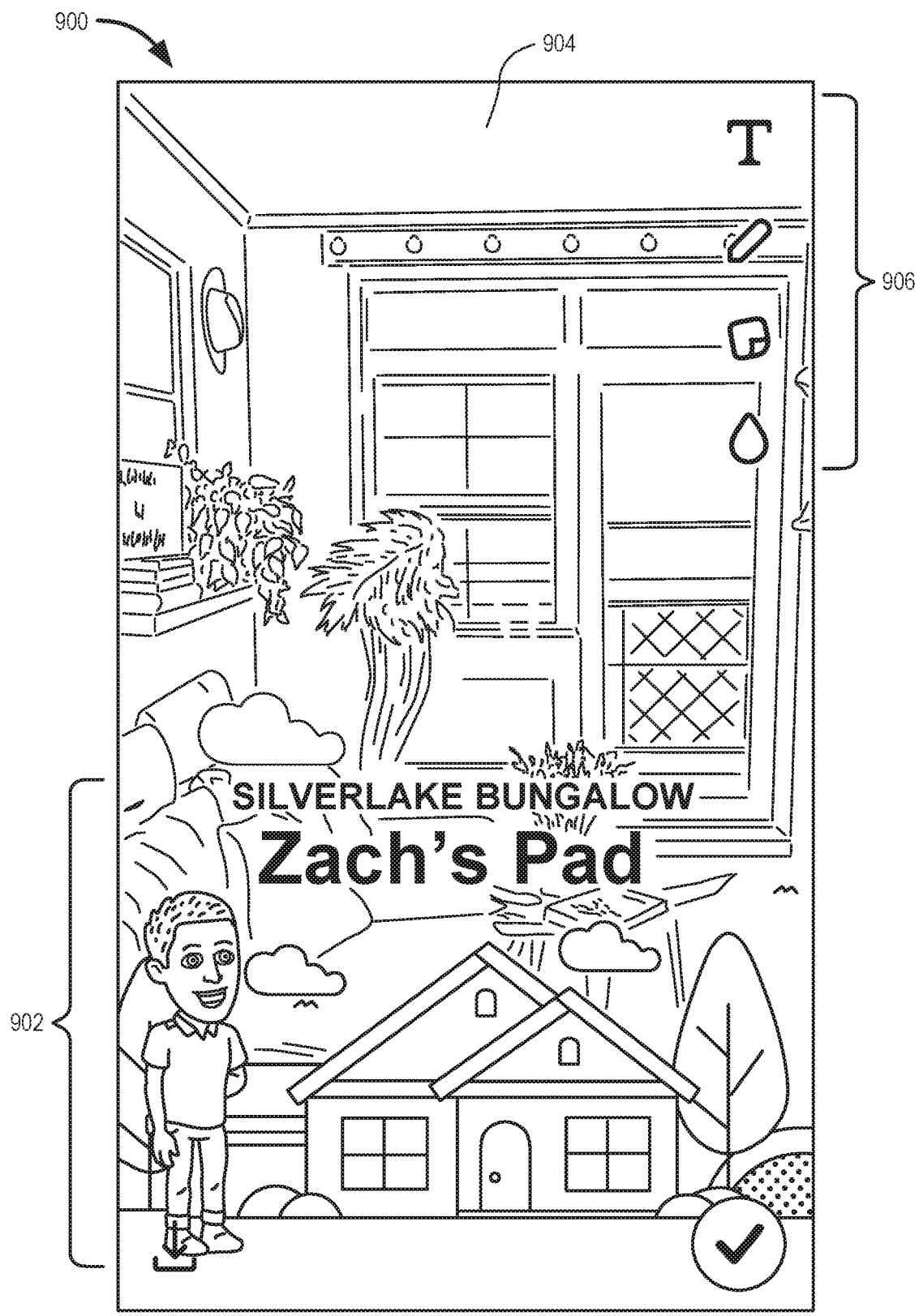

FIG. 9 illustrates an example GUI 900 that can be provided and displayed by a computing device to allow a user to create the home media overlay. For example, the GUI 900 shows the home media overlay portion 902 (which may comprise a template in one example), and an example background image 904 to illustrate how the home media overlay will appear when augmenting an image (or video). The GUI 900 also comprises a set of creative tools 906 for creating the media overlay. In one example creative tools include a text tool to add or edit text in the media overlay, an eraser tool to erase or remove portions of the media overlay, a sticker tool to add one or more stickers to the media overlay, a color tool to change the color scheme of the media overlay, a bitmoji or avatar tool to create or add a bitmoji or avatar to the media overlay, and so forth.

Once a user has finished creating the home media overlay, he can save and publish the media overlay. The computing device sends the media content for the media overlay to the server system. As explained above, the media content may comprise a creative with graphics related to the home of the first user, a bitmoji or avatar corresponding to the user, a bitmoji or avatar corresponding to another user currently located in the home of the first user, a graphic corresponding to a pet of the first user, and so forth. In one example, the media content comprises the template with any edits made using the creative tools.

The server system receives the media content from the computing device (e.g., as part of a request to generate a media overlay corresponding to the home of the first user as explained above) and generates the media overlay corresponding to the home of the first user using the received media content, as shown in operation 504 of FIG. 5. In one example, the server system flattens layers of the media overlay into a single image file and stores in one or more datastores (e.g., database(s) 120) for serving or providing to clients (e.g., client devices 110). For example, a user may have chosen a template and added one or more stickers and text to the template. The client device 110 sends the identifiers for the graphics (e.g., template identifier, stickers identifiers, etc.), the location of the stickers on the template, the style of text, and so forth, to the server system. The server system takes all of that information and renders a single image out of everything collapsed together. In one example, the rendering or flattening into a single image is performed by the client device 110 and the client device 110 sends the flattened or rendered image to the server system to be stored and served from the server system.

In operation 506, the server system determines a location of the home of the first user. In one example, the server system determines the location of the home of the first user based on location information corresponding to the first computing device. For example, the server system may receive location information (e.g., geographic coordinates determined via global positioning system (GPS) or similar technology) from the first computing device (e.g., as part of or separately from the request to generate the media overlay). The location of the home is used to trigger access to the home media overlay when an authorized user is in or around the location of the home.

In another example, the server system determines the location of the home of the first user based on location data indicating a most common location of the user (e.g., of the computing device of the user) overnight or during other times of the day when people are typically at home. The server system can cause this location to display to the user for selection of the location of the home by the user.

In one example, a confidence score can be assigned to a location chosen by a user for his home based on location data indicating that the location chosen is actually the user's home. Data indicating that the location chosen is actually the user's home may include hours a day spent in the chosen location, times of day spent in the chosen location (e.g., overnight), mapping data, and so forth. For example, if a user does not spend a threshold number of nights in the chosen location, the confidence score may be lower than if a user spends at least the threshold number of nights in the chosen location.

The confidence score can be used in various scenarios. For example, if a second user reports abuse indicating that the location is actually a second user's home (and not the first user's home), the server system can determine the need to escalate such a report. In another example, the confidence score can be used in other functionality in the messaging to determine whether to automatically populate home address or location details for the user.

Figure 10:
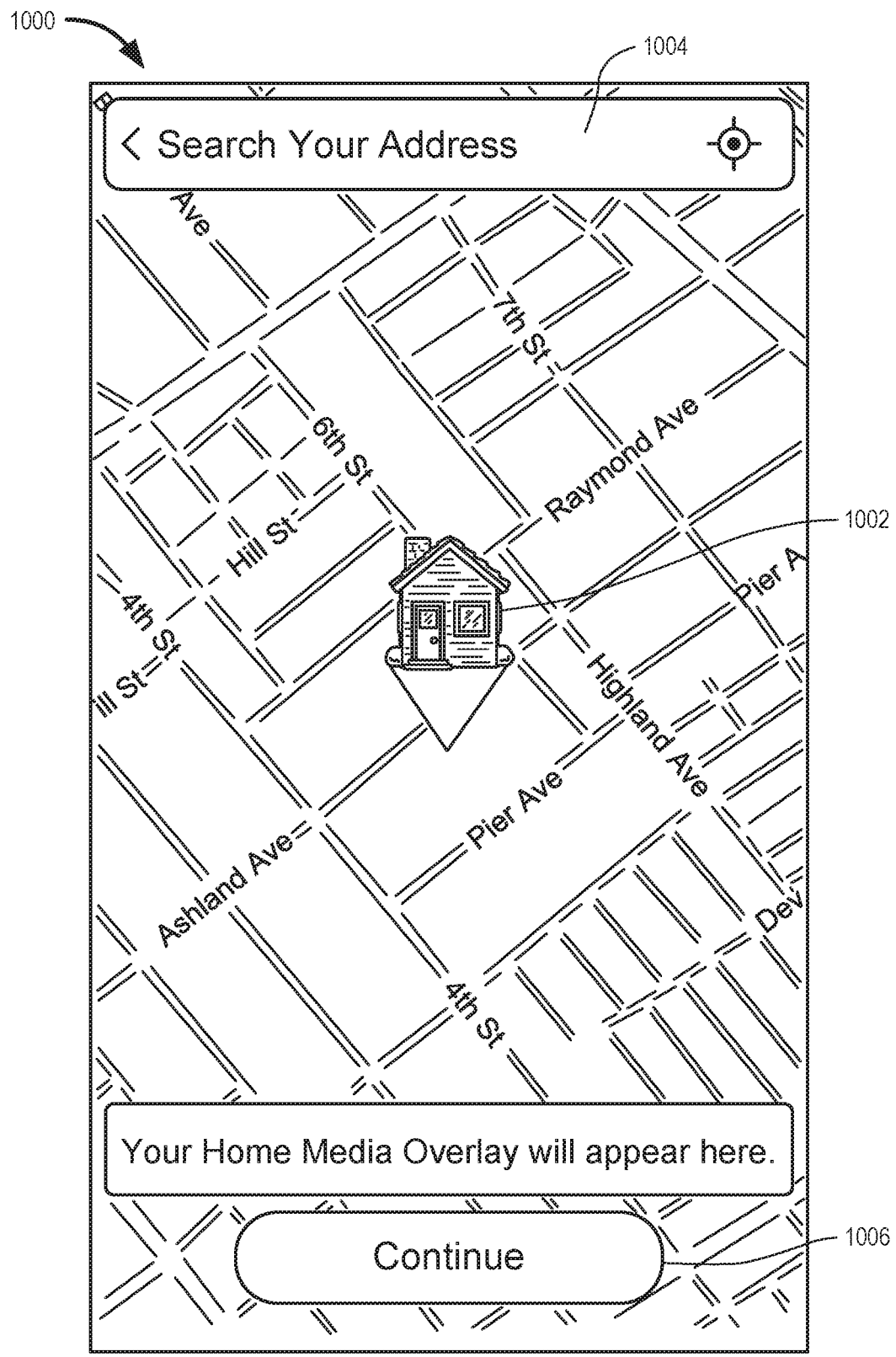

FIG. 10 illustrates an example GUI 1000 where a user can set the location for his home media overlay. In one example, the computing device automatically detects the location of the user based on GPS or similar technology and displays an indicator 1002 of the user's (e.g., computing device's) current location (or based on location data as explained above). This location can be used by the user to set as the home location, or the user can move the indicator 1002 to a different location (or move the map below the indicator until the indicator is displayed in the correct location), or search for a different location using the search box 1004. The user can save the location by, for example, selecting the continue button 1006

Figure 11:
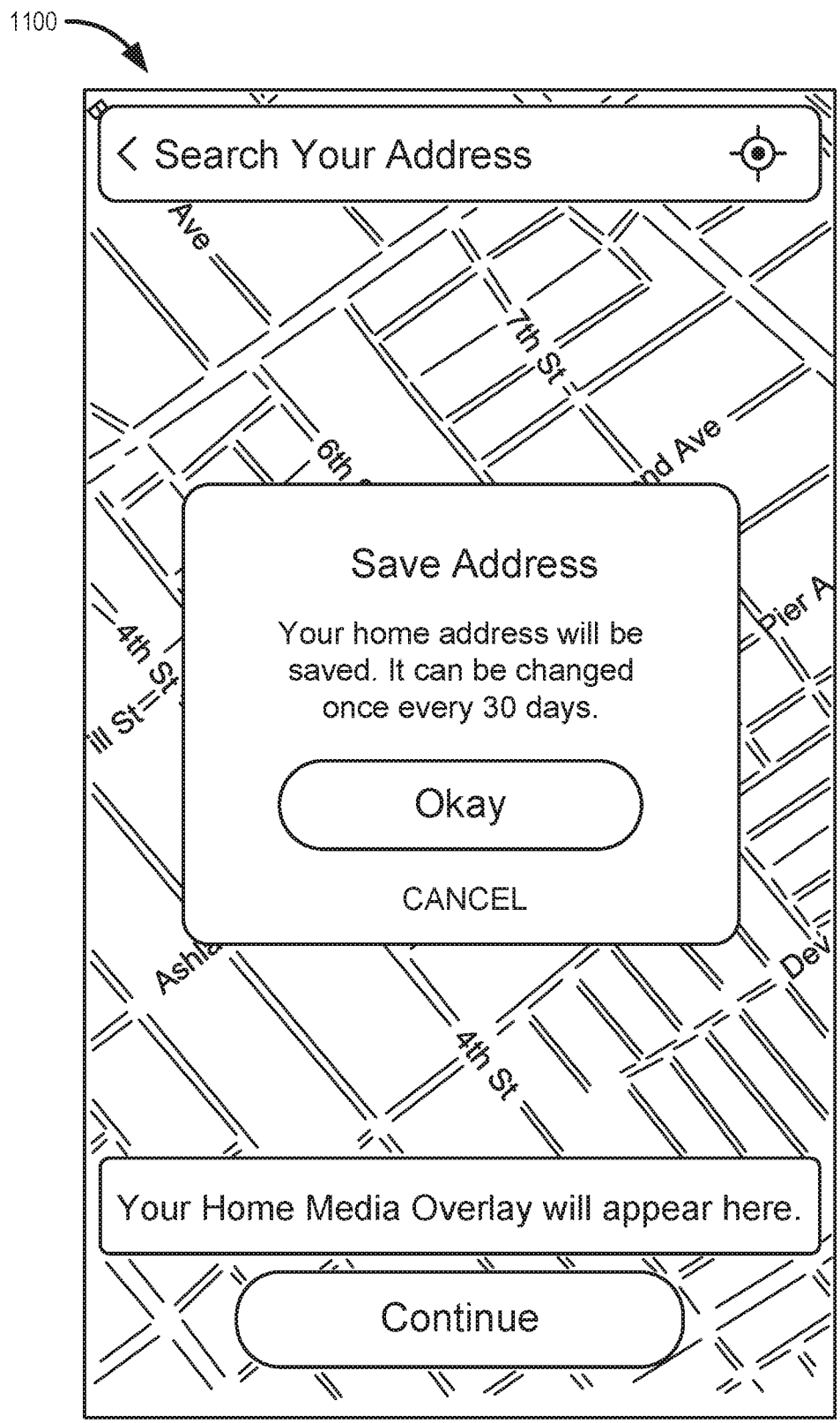
Figure 12:
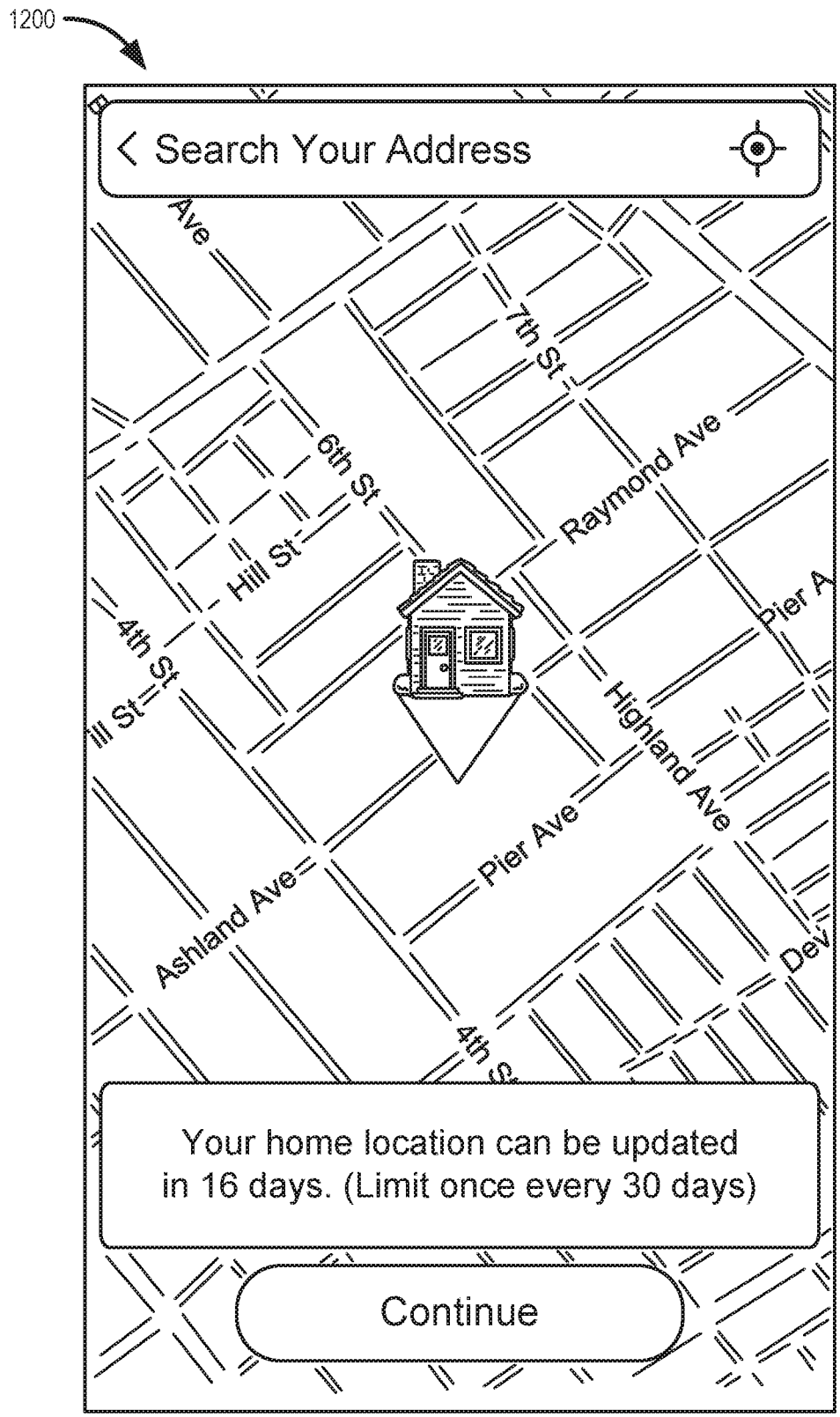

In one example, the location for the home of the user may only be changed after a specified time period (e.g., 15 days, 30 days, 2 months). For example, the specified time period may be 30 days and a GUI 1100 as shown in FIG. 11 may be displayed to the user to alert the user of the specified time period. If the user attempts to change the location of his home before the specified time period has passed, a message such as the one shown in the GUI 1200 of FIG. 12 is displayed to the user. The amount of days remaining until the home location can be updated can be calculated based on the last change date. For example, if the last time the home location was changed was on March 1, the location cannot be updated until March 30.

Returning to FIG. 5, in operation 508, the server system receives a selection of users to grant permission to access the media overlay corresponding to the home of the first user. In one example, the selection of users to grant permission to access the media overlay comprises users with a bi-directional connection with the first user in a social networking system.

Figure 13:
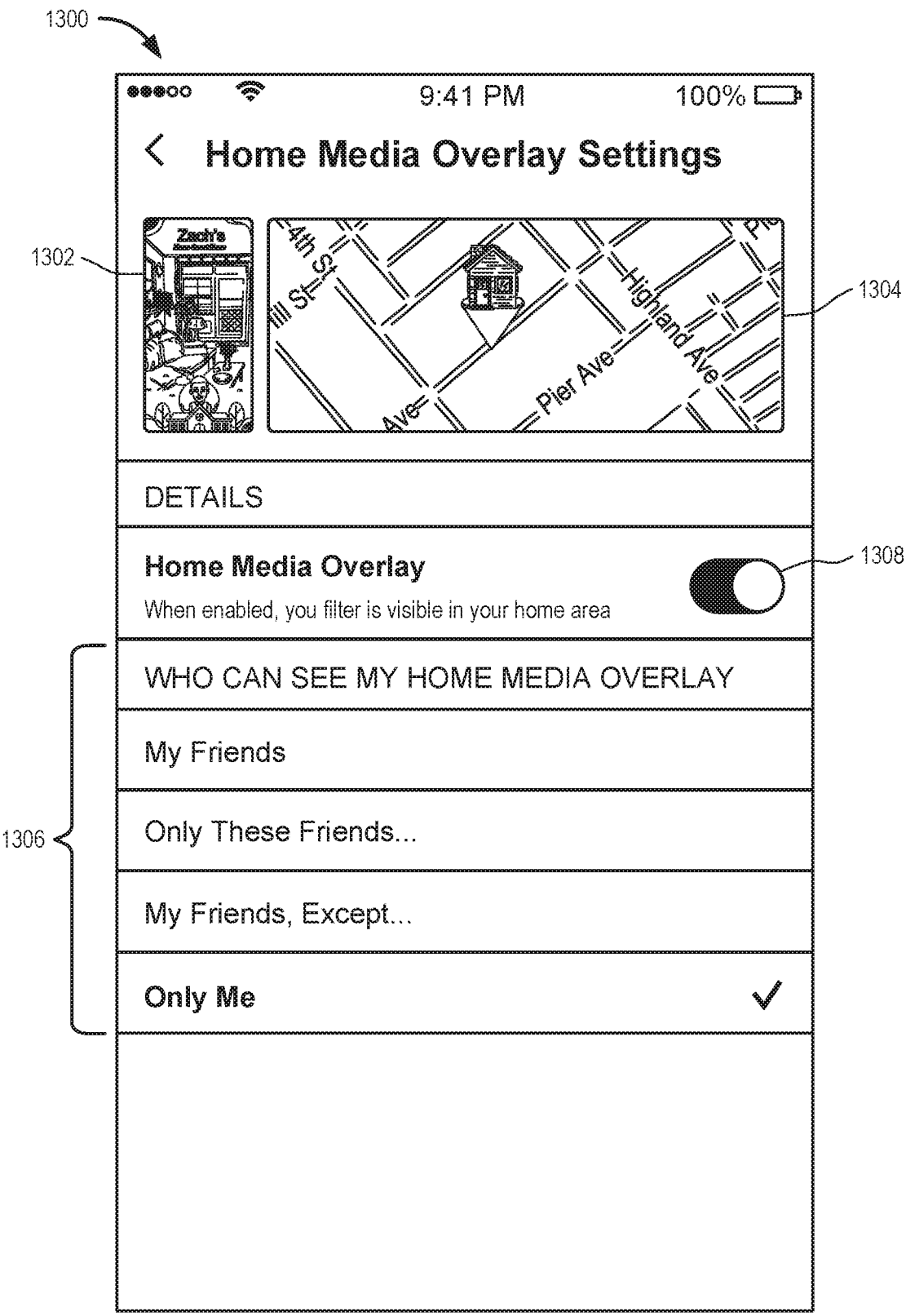

FIG. 13 illustrates an example GUI 1300 for home media overlay settings. In the GUI 1300, a thumbnail 1302 of the home media overlay that has been created by the user is displayed. A user may select the thumbnail to edit or change the home media overlay. The location 1304 for the home media overlay is also displayed in the GUI 1300. The user may select the location 1304 to change the location for the home media overlay. The GUI 1300 further allows an option 1308 for the user to enable his home media overlay. The user can also choose who can access the user's home media overlay by selecting one or more options 1306. The user selection of one or more of the options 1306 indicates the selection of users to grant permission to access the media overlay. As explained above, in one example this may only include users with a bi-directional connection with the user in a social networking system (e.g., where the user and the other user have each designated each other as friends).

Figure 14:
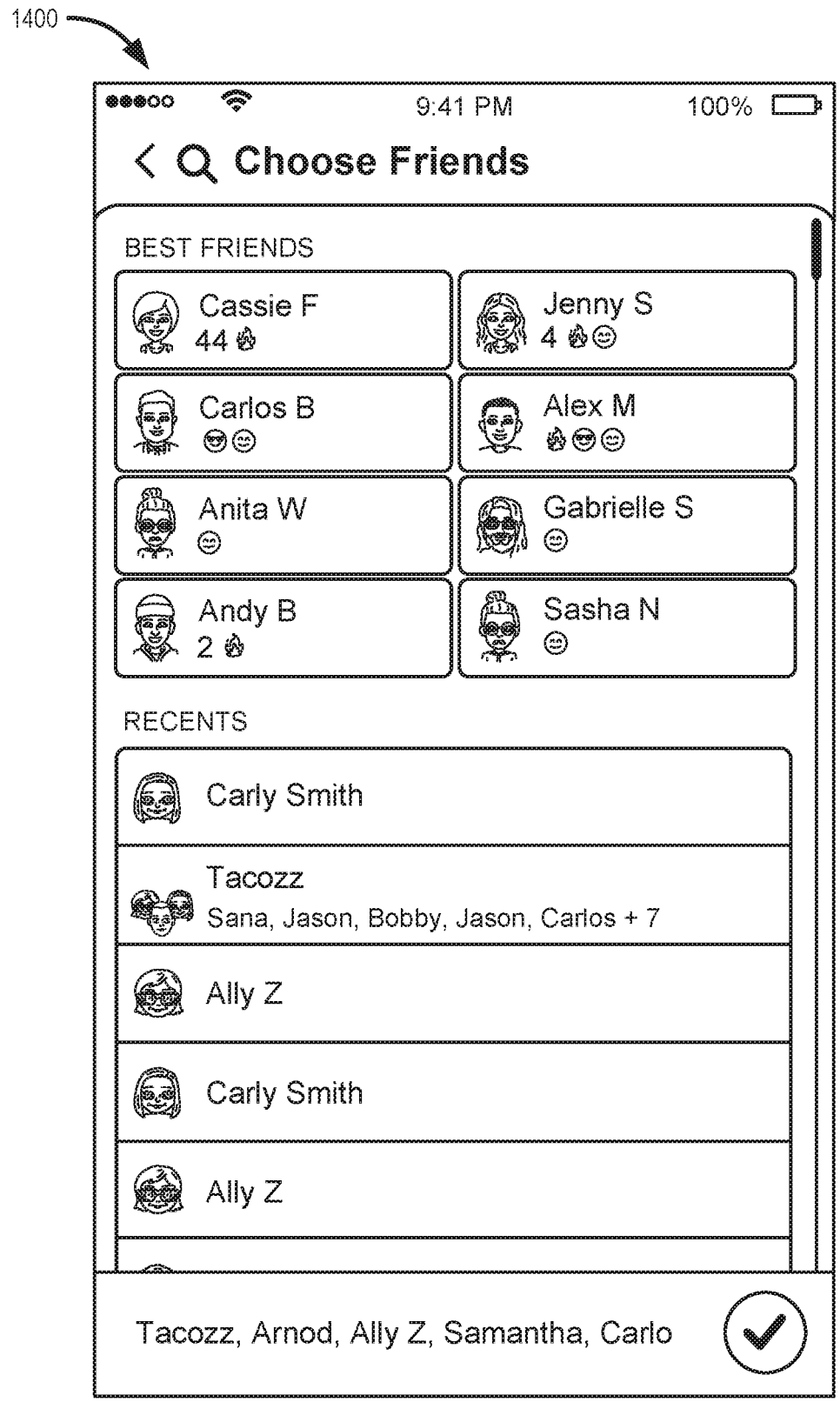

In the example shown in FIG. 13, the user can select "My Friends" to select all friends of the user. In this example, the user can also select "My Friends. Except . . . " which will allow the user to generate a list of friends that will not be allowed access to the home media overlay (e.g., a blacklist). The user can also select "Only Me" to make the home media overlay private so that no one else but the user can access or use the home media overlay. The user can also choose specific friends (e.g., "Only These Friends . . . ") which will allow the user to select specific friends, as shown in the GUI 1400 of FIG. 14. Once the user has selected the users to whom to grant permission to access the media overlay corresponding to the home of the first user, the computing device receives the selection and sends the selection to the server system.

In another example, the server system uses a default selection of users with a bi-directional connection with the first user in a social networking system. In this example, the user does not need to make any selection, the server system will automatically determine users to whom to grant permission to access the media overlay corresponding to the home of the first user based on those users having a bi-directional connection with the first user in a social networking system. The server system will associate the users having a bi-directional connection with the first user in a social networking system with the media overlay and store the association with the media overlay (e.g., as triggers for the media overlay as described below).

Returning to FIG. 5, in operation 510, the server system associates the location of the home of the first user and the selection of the users to grant permission to access the media overlay corresponding to the home of the first user, with the media overlay. In operation 512, the server system stores the media overlay and associated location of the home of the first user and the selection of users (e.g., in one or more databases 120). For example, the location of the home of the first user and the selection of users are stored as triggers for when the media overlay can be accessed or made available to a computing device (e.g., when a selected user is located in the home of the first user). Once the media overlay is enabled, the media overlay can be provided to a computing device when the location of the computing device and the user associated with the computing device match the triggers for the media overlay.

Figure 15:
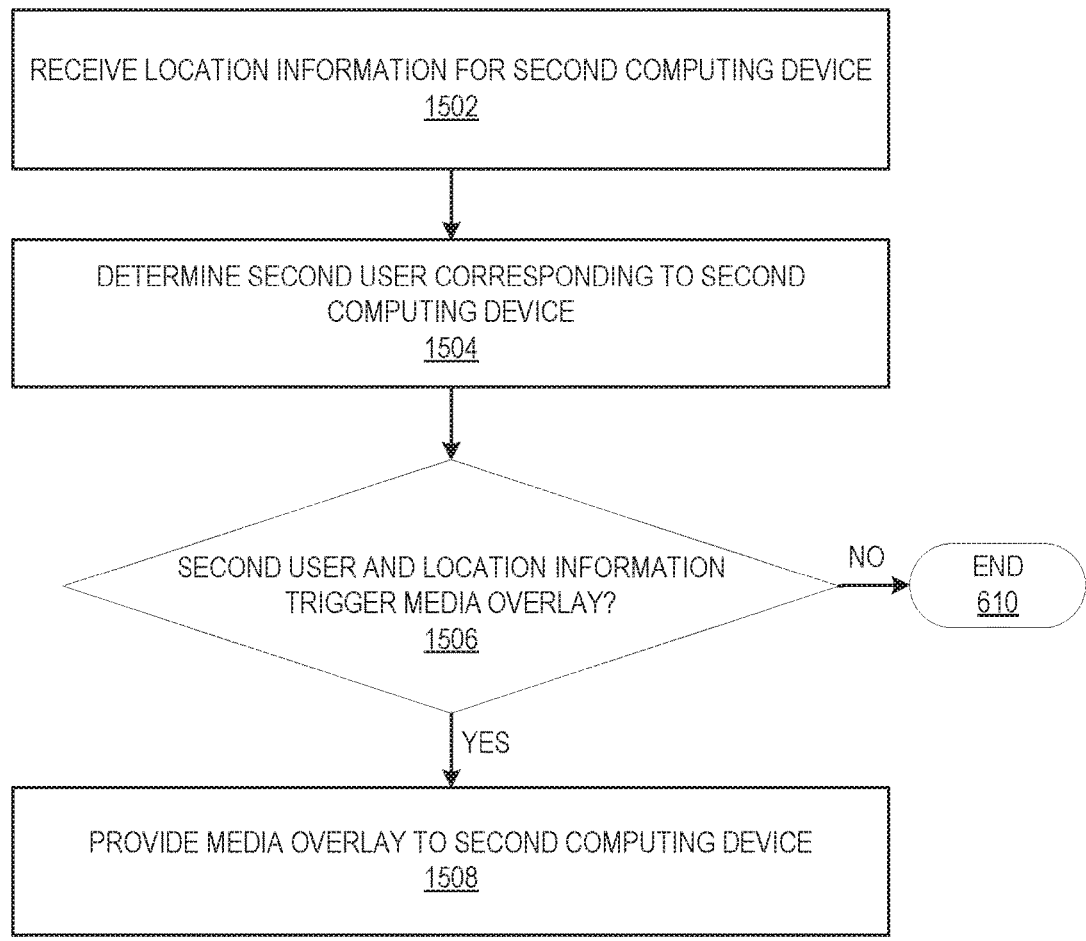
FIG. 15 is a flow chart illustrating aspects of a method, according to some example embodiments.

FIG. 15 is a flow chart illustrating aspects of a method 1500, for a custom media overlay system, according to some example embodiments. For illustrative purposes, the method 1500 is described with respect to the networked system 100 of FIG. 1. It is to be understood that the method 1500 may be practiced with other system configurations in other embodiments.

In operation 1502, a server system (e.g., server system 108, application server 112, media content processing system 118, etc.) receives location information corresponding to a location of a second computing device. For example, a second user may be visiting the home of the first user and be using the second computing device. The second computing device determines the location (e.g., via GPS or other technology) and sends the location information to the server system.

In operation 1504, the server system determines the second user corresponding to the second computing device. For example, the second computing device may send a user name or other information identifying the user (e.g., via computing device identifier, login information, etc.). The server system receives the information identifying the user to determine the second user.

In operation 1506, the server system determines whether the second user and the location information corresponding to the second computing device trigger access to the media overlay corresponding to the home of the first user. For example, the server system determines whether the location information matches the location of the home of the first user. For example, the server system determines whether the location information matches an address of the home of the first user or the location information falls within a predefined radius of the location of the home of the first user (e.g., a 10 meter radius, a 50 meter radius, etc.). The server system determines whether the second user (e.g., name or unique identifier of the second user) matches one of the users in the selection of users to grant permission to access the media overlay corresponding to the home of the user. If the second user and the location information do not trigger the media overlay (e.g., the second user does not match a user in the selection of users and the location information does not fall within the location of the home of the first user) the method 1500 ends at operation 610. If the second user and the location information do trigger the media overlay (e.g., the second user does match a user in the selection of users and the location information does fall within the location of the home of the first user), the method 1500 continues to operation 1508.

In operation 1508, the server system provides the media overlay corresponding to the home of the first users to the second computing device, based on determining that the second user and location information corresponding to the second computing device trigger access to the media overlay. For example, the server system retrieves the stored media overlay and sends the media overlay to the second computing device. The second computing device receives the media overlay and displays the media overlay or an option to select the media overlay in a GUI on the second computing device.

In one example, the computing device or server system detects when a selected user is near the first user's home (e.g., within a predefined distance, such as a hundred meters, a few hundred meters, etc.) and can pre-load (e.g., download) the home media overlay for the first user's home on the selected user's computing device in advance so that it is available when the selected user arrives to the first user's home.

Figure 16:
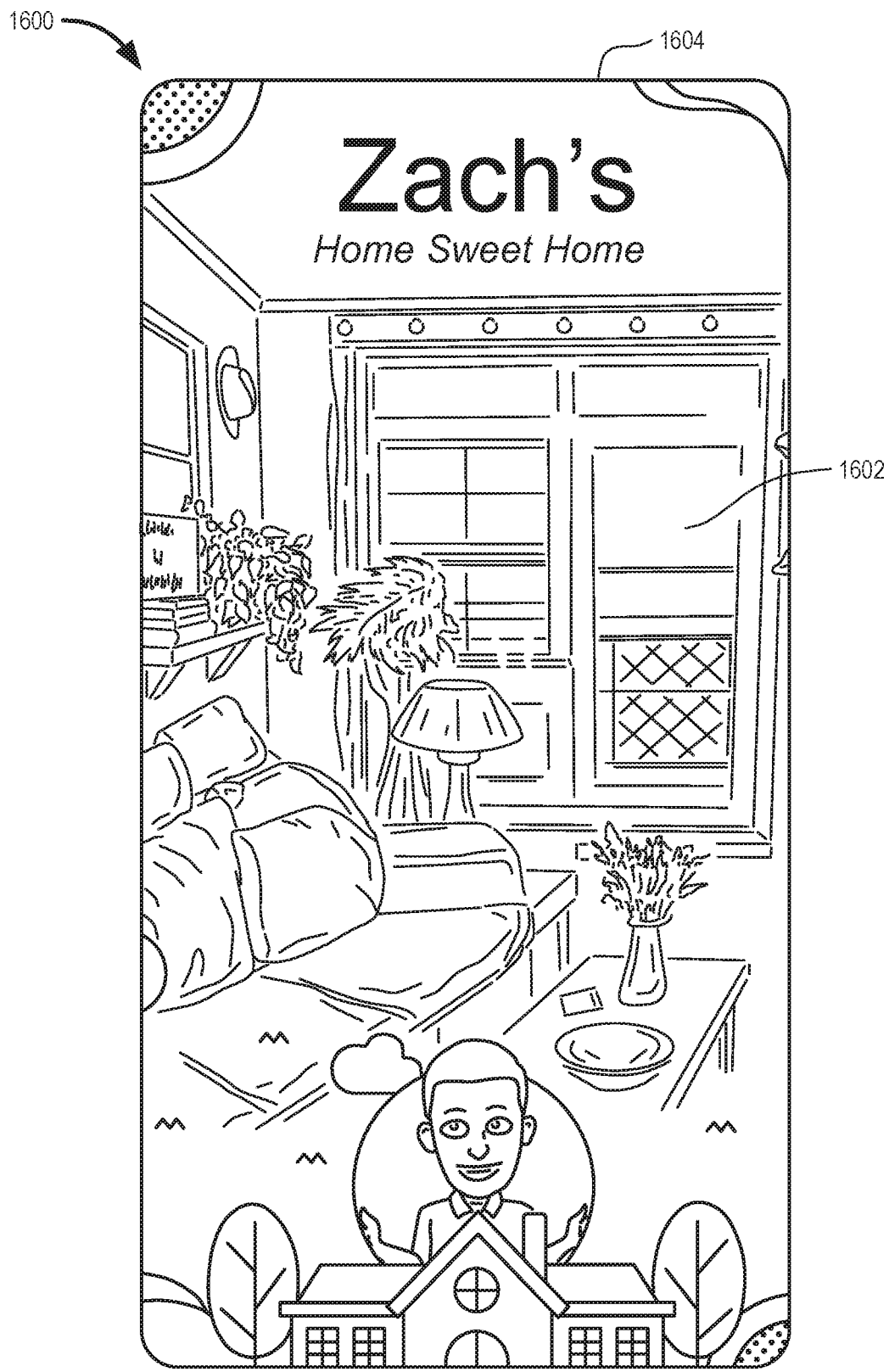
FIG. 16 illustrates an example graphical user interface, according to some example embodiments.

The media overlay provided to the second computing device is used to augment an image or video captured by the second computing device. For example, the second user may be using a camera of the second computing device to capture an image (e.g., photograph) or video on the second computing device. The second user selects the media overlay provided by the server system. The second computing device receives the selection of the media overlay and displays the media overlay on top of the image or video being captured or captured by the camera of the computing device. The second user can then send the image or video augmented by the media overlay to another user. FIG. 16 illustrates an example GUI 1600 with an image 1602 augmented by the media overlay 1604.

The second computing device sends the image or video augmented by the media overlay to the server system. The server system receives the image or video augmented by the media overlay and sends the image or video augmented by the media overlay (e.g., as a message) to at least a third computing device. In this way authorized users located in the first user's home can access and use the media overlay corresponding to the home of the first user.

In one example, a media overlay corresponding to the home of a user can be automatically updated based on context related to the user or the location of the home of the user. The context may correspond to a time of day, a time of year, weather conditions for the home location, behaviors or activities of the user, presence of other users in the home, events in the home, and so forth. For example, the stored media overlay may be in the context of daytime in the summer with only the user represented in the media overlay (e.g., as a bitmoji or avatar). In one example the server system detects a change from a first context to a second context. For example, the server system may determine that it is now nighttime instead of day time. The server system may automatically revise the media overlay to reflect that it is nighttime at the location of the user's home. For example, the media overlay could be revised to show stars or a moon, or that lights are on in the home. In another example, the media overlay could be revised to show the user's avatar in pajamas. The server system stores the revised media overlay and provides the revised media overlay to a computing device of a selected user when a selected user is in the user's home, as described above. In one example, the context corresponds to an activity corresponding to the first user (e.g., waking up, eating breakfast, getting ready for school or work, eating lunch, eating dinner, going to bed, etc.), weather conditions for the location of the home of the first user (e.g., sun, snow, wind, rain, clouds, etc.), an event (e.g., party or game night), a number of users located in the home (e.g., an avatar to represent a brother, friend, mother, daughter, etc.), and so forth. In this way the home overlay can be automatically updated based on context corresponding to the user or home.

In one example, the computing system allows users to flag or report a media overlay corresponding to a user's home for inappropriate content. For example, a user can report that the media overlay contains nudity or sexual content; harassment or hate speech; threatening, violent, or concerning content; content indicating the user is someone other than his/herself; or other reasons.

Figure 17:
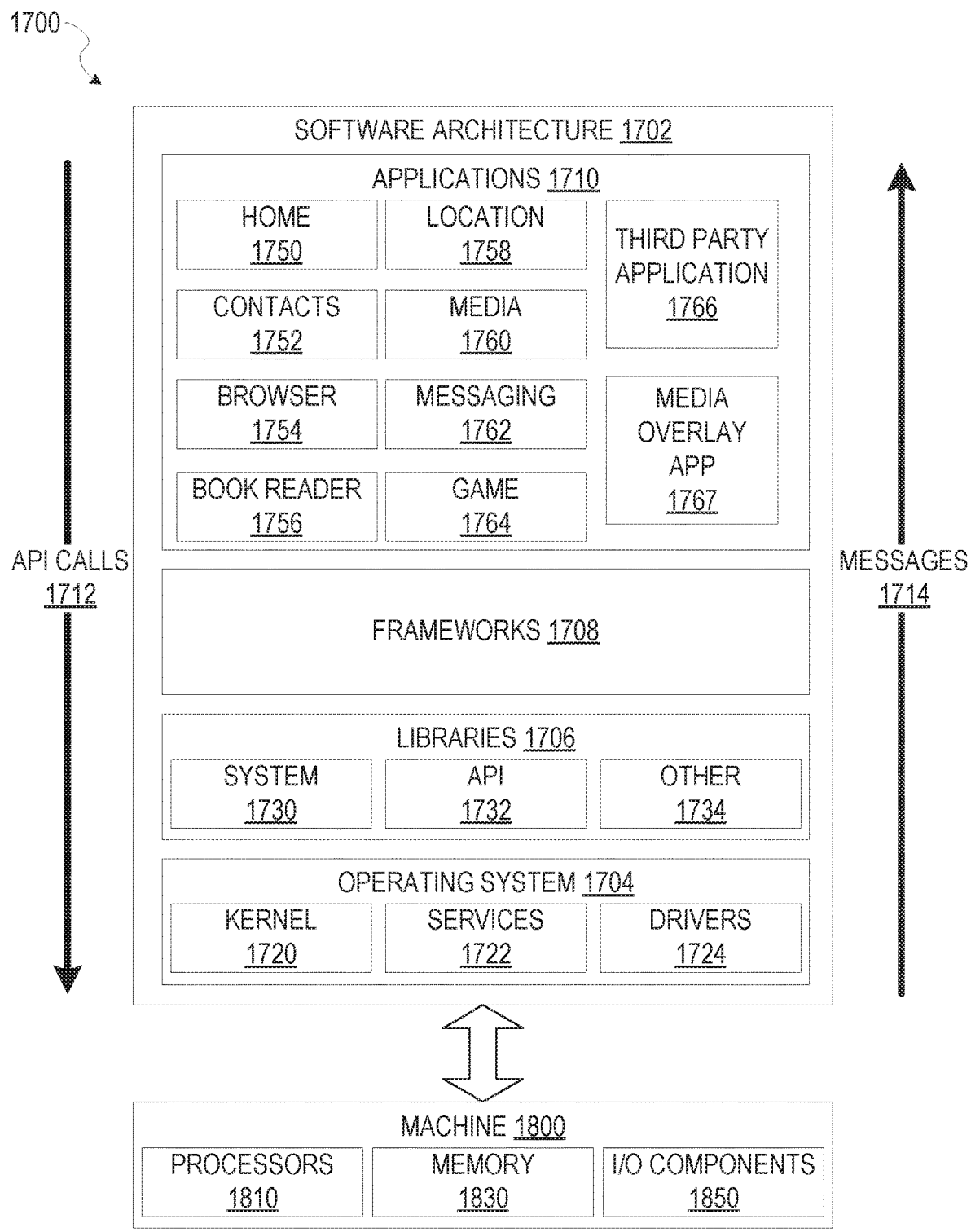
FIG. 17 is a block diagram illustrating an example of a software architecture that may be installed on a machine, according to some example embodiments.

FIG. 17 is a block diagram 1700 illustrating a software architecture 1702, which can be installed on any one or more of the devices described above. For example, in various embodiments, client devices 110, server systems 102, 112, 116, 118, 122, and 124 may be implemented using some or all of the elements of the software architecture 1702. FIG. 17 is merely a non-limiting example of a software architecture, and it will be appreciated that many other architectures can be implemented to facilitate the functionality described herein. In various embodiments, the software architecture 1702 is implemented by hardware such as a machine 1800 of FIG. 18 that includes processors 1810, memory 1830, and I/O components 1850. In this example, the software architecture 1702 can be conceptualized as a stack of layers where each layer may provide a particular functionality. For example, the software architecture 1702 includes layers such as an operating system 1704, libraries 1706, frameworks 1708, and applications 1710. Operationally, the applications 1710 invoke API calls 1712 through the software stack and receive messages 1714 in response to the API calls 1712, consistent with some embodiments.

In various implementations, the operating system 1704 manages hardware resources and provides common services. The operating system 1704 includes, for example, a kernel 1720, services 1722, and drivers 1724. The kernel 1720 acts as an abstraction layer between the hardware and the other software layers, consistent with some embodiments. For example, the kernel 1720 provides memory management, processor management (e.g., scheduling), component management, networking, and security settings, among other functionality. The services 1722 can provide other common services for the other software layers. The drivers 1724 are responsible for controlling or interfacing with the underlying hardware, according to some embodiments. For instance, the drivers 1724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1706 provide a low-level common infrastructure utilized by the applications 1710. The libraries 1706 can include system libraries 1730 (e.g., C standard library) that can provide functions such as memory allocation functions, string manipulation functions, mathematic functions, and the like. In addition, the libraries 1706 can include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3). Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render two-dimensional (2D) and three-dimensional (3D) graphic content on a display), database libraries (e.g., SQLite to provide various relational database functions), web libraries (e.g., WebKit to provide web browsing functionality), and the like. The libraries 1706 can also include a wide variety of other libraries 1734 to provide many other APIs to the applications 1710.

The frameworks 1708 provide a high-level common infrastructure that can be utilized by the applications 1710, according to some embodiments. For example, the frameworks 1708 provide various graphic user interface (GUI) functions, high-level resource management, high-level location services, and so forth. The frameworks 1708 can provide a broad spectrum of other APIs that can be utilized by the applications 1710, some of which may be specific to a particular operating system 1704 or platform.

In an example embodiment, the applications 1710 include a home application 1750, a contacts application 1752, a browser application 1754, a book reader application 1756, a location application 1758, a media application 1760, a messaging application 1762, a game application 1764, and a broad assortment of other applications such as a third-party application 1766. According to some embodiments, the applications 1710 are programs that execute functions defined in the programs. Various programming languages can be employed to create one or more of the applications 1710, structured in a variety of manners, such as object-oriented programming languages (e.g., Objective-C, Java, or C++) or procedural programming languages (e.g., C or assembly language). In a specific example, the third-party application 1766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1766 can invoke the API calls 1712 provided by the operating system 1704 to facilitate functionality described herein.

Some embodiments may particularly include a media overlay application 1767. In certain embodiments, this may be a standalone application that operates to manage communications with a server system, such as third-party servers or the server system 108. In other embodiments, this functionality may be integrated with another application (e.g., the messaging application 1762). The media overlay application 1767 may request and display various data related to messaging, media content, media collections, media overlays, mapping, chance mode, and so forth, and may provide the capability for a user to input data related to the system via a touch interface, via a keyboard, or using a camera device of the machine 1800, communication with a server system via the I/O components 1850, and receipt and storage of object data in the memory 1830. Presentation of information and user inputs associated with the information may be managed by the media overlay application 1767 using different frameworks 1708, library 1706 elements, or operating system 1704 elements operating on the machine 1800.

Figure 18:
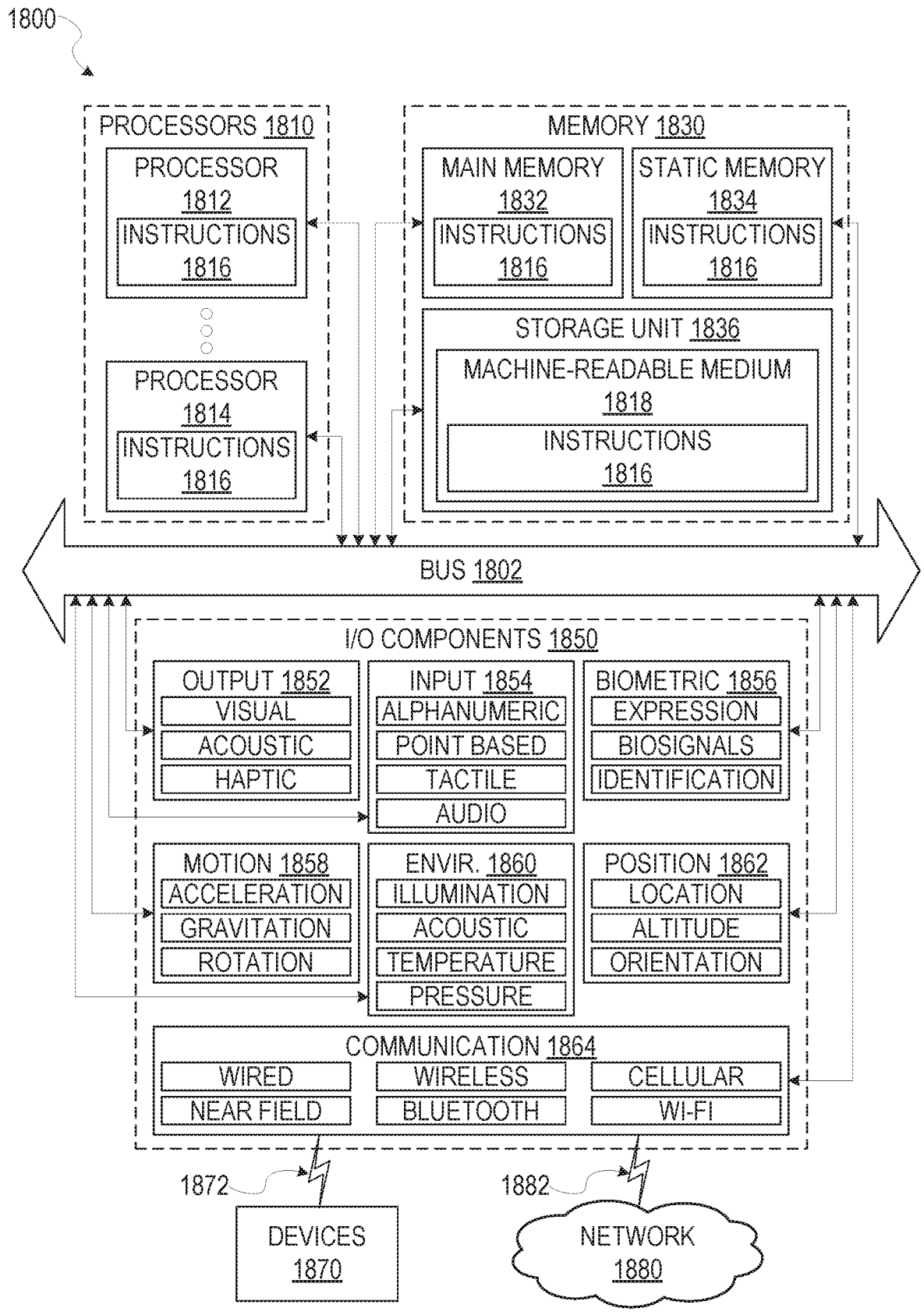
FIG. 18 illustrates a diagrammatic representation of a machine, in the form of a computer system, within which a set of instructions may be executed for causing the machine to perform any one or more of the methodologies discussed herein, according to an example embodiment.

FIG. 18 is a block diagram illustrating components of a machine 1800, according to some embodiments, able to read instructions from a machine-readable medium (e.g., a machine-readable storage medium) and perform any one or more of the methodologies discussed herein. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein can be executed. In alternative embodiments, the machine 1800 operates as a standalone device or can be coupled (e.g., networked) to other machines. In a networked deployment, the machine 1800 may operate in the capacity of a server machine 102, 112, 116, 118, 122, 124, and the like, or a client device 110 in a server-client network environment, or as a peer machine in a peer-to-peer (or distributed) network environment. The machine 1800 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines 1800 that individually or jointly execute the instructions 1816 to perform any one or more of the methodologies discussed herein.

In various embodiments, the machine 1800 comprises processors 1810, memory 1830, and I/O components 1850, which can be configured to communicate with each other via a bus 1802. In an example embodiment, the processors 1810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1812 and a processor 1814 that may execute the instructions 1816. The term "processor" is intended to include multi-core processors 1810 that may comprise two or more independent processors 1812, 1814 (also referred to as "cores") that can execute instructions 1816 contemporaneously. Although FIG. 18 shows multiple processors 1810, the machine 1800 may include a single processor 1810 with a single core, a single processor 1810 with multiple cores (e.g., a multi-core processor 1810), multiple processors 1812, 1814 with a single core, multiple processors 1812, 1814 with multiple cores, or any combination thereof.

The memory 1830 comprises a main memory 1832, a static memory 1834, and a storage unit 1836 accessible to the processors 1810 via the bus 1802, according to some embodiments. The storage unit 1836 can include a machine-readable medium 1818 on which are stored the instructions 1816 embodying any one or more of the methodologies or functions described herein. The instructions 1816 can also reside, completely or at least partially, within the main memory 1832, within the static memory 1834, within at least one of the processors 1810 (e.g., within the processor's cache memory), or any suitable combination thereof, during execution thereof by the machine 1800. Accordingly, in various embodiments, the main memory 1832, the static memory 1834, and the processors 1810 are considered machine-readable media 1818.

As used herein, the term "memory" refers to a machine-readable medium 1818 able to store data temporarily or permanently and may be taken to include, but not be limited to, random-access memory (RAM), read-only memory (ROM), buffer memory, flash memory, and cache memory. While the machine-readable medium 1818 is shown, in an example embodiment, to be a single medium, the term "machine-readable medium" should be taken to include a single medium or multiple media (e.g., a centralized or distributed database, or associated caches and servers) able to store the instructions 1816. The term "machine-readable medium" shall also be taken to include any medium, or combination of multiple media, that is capable of storing instructions (e.g., instructions 1816) for execution by a machine (e.g., machine 1800), such that the instructions 1816, when executed by one or more processors of the machine 1800 (e.g., processors 1810), cause the machine 1800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1850 include a wide variety of components to receive input, provide output, produce output, transmit information, exchange information, capture measurements, and so on. In general, it will be appreciated that the I/O components 1850 can include many other components that are not shown in FIG. 18. The I/O components 1850 are grouped according to functionality merely for simplifying the following discussion, and the grouping is in no way limiting. In various example embodiments, the I/O components 1850 include output components 1852 and input components 1854. The output components 1852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1850 include biometric components 1856, motion components 1858, environmental components 1860, or position components 1862, among a wide array of other components. For example, the biometric components 1856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1858 include acceleration sensor components (e.g., accelerometer), gravitation sensor components, rotation sensor components (e.g., gyroscope), and so forth. The environmental components 1860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1850 may include communication components 1864 operable to couple the machine 1800 to a network 1880 or devices 1870 via a coupling 1882 and a coupling 1872, respectively. For example, the communication components 1864 include a network interface component or another suitable device to interface with the network 1880. In further examples, communication components 1864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1870 may be another machine 1800 or any of a wide variety of peripheral devices (e.g., a peripheral device coupled via a Universal Serial Bus (USB)).

Moreover, in some embodiments, the communication components 1864 detect identifiers or include components operable to detect identifiers. For example, the communication components 1864 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code. Data Matrix. Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1864, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1880 or a portion of the network 1880 may include a wireless or cellular network, and the coupling 1882 may be a Code Division Multiple Access (CDMA) connection, a Global System for Mobile communications (GSM) connection, or another type of cellular or wireless coupling. In this example, the coupling 1882 can implement any of a variety of types of data transfer technology, such as Single Carrier Radio Transmission Technology (1xRTT), Evolution-Data Optimized (EVDO) technology. General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX). Long Term Evolution (LTE) standard, others defined by various standard-setting organizations, other long range protocols, or other data transfer technology.

In example embodiments, the instructions 1816 are transmitted or received over the network 1880 using a transmission medium via a network interface device (e.g., a network interface component included in the communication components 1864) and utilizing any one of a number of well-known transfer protocols (e.g., Hypertext Transfer Protocol (HTTP)). Similarly, in other example embodiments, the instructions 1816 are transmitted or received using a transmission medium via the coupling 1872 (e.g., a peer-to-peer coupling) to the devices 1870. The term "transmission medium" shall be taken to include any intangible medium that is capable of storing, encoding, or carrying the instructions 1816 for execution by the machine 1800, and includes digital or analog communications signals or other intangible media to facilitate communication of such software.

Furthermore, the machine-readable medium 1818 is non-transitory (in other words, not having any transitory signals) in that it does not embody a propagating signal. However, labeling the machine-readable medium 1818 "non-transitory" should not be construed to mean that the medium is incapable of movement; the machine-readable medium 1818 should be considered as being transportable from one physical location to another. Additionally, since the machine-readable medium 1818 is tangible, the machine-readable medium 1818 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    receiving, by a server system from a first computing device, a request to generate a media overlay corresponding to a home of a first user, the request comprising media content to be included in the media overlay;
    generating, by the server system, the media overlay corresponding to the home of the first user, using the received media content;
    determining, by the server system, a location of the home of the first user;
    receiving, by the server system a selection of users to whom to grant permission to access the media overlay corresponding to the home of the first user;
    associating, by the server system, the location of the home of the first user and the selection of users with the media overlay;
    storing, by the server system, the media overlay and associated location of the home of the first user and selection of users;
    receiving, by the server system, location information corresponding to a location of a second computing device;
    determining, by the server system, a second user corresponding to the second computing device;
    determining, by the server system, whether the second user and the location information corresponding to the second computing device trigger access to the media overlay; and
    providing, by the server system, the media overlay to the second computing device, based on determining that the second user and the location information corresponding to the second computing device trigger access to the media overlay.

2. The method of claim 1, wherein before receiving the request to generate the media overlay corresponding to the home of the first user, the method comprises:
    providing a plurality of templates for creating the media overlay;
    receiving a selection of one template of the plurality of templates;
    causing display of the one template and creative tools for editing the one template; and
    wherein the received media content to be included in the media overlay comprises the one template comprising edits using the creative tools.

3. The method of claim 1, wherein the media content comprises at least one of a creative with graphics related to the home of the first user, a bitmoji corresponding to the first user, a bitmoji corresponding to another user located in the home of the first user, and a graphic corresponding to a pet of the first user.

4. The method of claim 1, wherein determining the location of the home of the first user is based on location information corresponding to the first computing device.

5. The method of claim 1, wherein the selection of users to whom to grant permission to access the media overlay comprises users with a bi-directional connection with the first user in a social networking system.

6. The method of claim 1, wherein the media overlay provided to the second computing device is used to augment an image or video captured by the second computing device.

7. The method of claim 6, further comprising:
    receiving, from the second computing device, the image or video augmented by the media overlay; and
    sending the image or video augmented by the media overlay as a message to a third computing device.

8. The method of claim 1, wherein the stored media overlay corresponds to a first context, and the method further comprises:
    detecting a change from a first context to a second context;
    revising the media overlay to reflect the new context;
    storing the revised media overlay;
    receiving location information corresponding to a location of a third computing device;
    determining a third user corresponding to the third computing device;
    determining whether the third user and location information corresponding to the third computing device trigger access to the revised media overlay; and
    providing the revised media overlay to the second computing device, based on determining that the third user and location information corresponding to the third computing device trigger access to the revised media overlay.

9. The method of claim 8, wherein the first or second context corresponds to an activity corresponding to the first user, weather conditions for the location of the home of the first user, an event, or a number of users located in the home of the first user.

10. The method of claim 1, wherein the location of the home of the user that is associated with the media overlay can only be changed after a specified time period.

11. A server system comprising:
    a memory that stores instructions; and
    one or more processors configured by the instructions to perform operations comprising:
        receiving a request to generate a media overlay corresponding to a home of a first user, the request comprising media content to be included in the media overlay;
        generating the media overlay corresponding to the home of the first user, using the received media content;
        determining a location of the home of the first user;
        receiving a selection of users to whom to grant permission to access the media overlay corresponding to the home of the first user;
        associating the location of the home of the first user and the selection of users with the media overlay;
        storing the media overlay and associated location of the home of the first user and selection of users;
        receiving location information corresponding to a location of a second computing device;

determining a second user corresponding to the second computing device;

determining whether the second user and the location information corresponding to the second computing device trigger access to the media overlay; and providing the media overlay to the second computing device, based on determining that the second user and the location information corresponding to the second computing device trigger access to the media overlay.

12. The server system of claim 11, wherein before receiving the request to generate the media overlay corresponding to the home of the first user, the operations further comprise:

providing a plurality of templates for creating the media overlay;

receiving a selection of one template of the plurality of templates;

causing display of the one template and creative tools for editing the one template; and wherein the received media content to be included in the media overlay comprises the one template comprising edits using the creative tools.

13. The server system of claim 11, wherein the media content comprises at least one of a creative with graphics related to the home of the first user, a bitmoji corresponding to the first user, a bitmoji corresponding to another user located in the home of the first user, and a graphic corresponding to a pet of the first user.

14. The server system of claim 11, wherein determining the location of the home of the first user is based on location information corresponding to the first computing device.

15. The server system of claim 11, wherein the selection of users to whom to grant permission to access the media overlay comprises users with a bi-directional connection with the first user in a social networking system.

16. The server system of claim 11, wherein the media overlay provided to the second computing device is used to augment an image or video captured by the second computing device, and wherein the operations further comprise:

receiving, from the second computing device, the image or video augmented by the media overlay; and sending the image or video augmented by the media overlay as a message to a third computing device.

17. The server system of claim 11, wherein the stored media overlay corresponds to a first context, and the operations further comprise:

detecting a change from a first context to a second context;

revising the media overlay to reflect the new context;

storing the revised media overlay;

receiving location information corresponding to a location of a third computing device;

determining a third user corresponding to the third computing device;

determining whether the third user and location information corresponding to the third computing device trigger access to the revised media overlay; and providing the revised media overlay to the second computing device, based on determining that the third user and location information corresponding to the third computing device trigger access to the revised media overlay.

18. The server system of claim 17, wherein the first or second context corresponds to an activity corresponding to the first user, weather conditions for the location of the home of the first user, an event, or a number of users located in the home of the first user.

19. The server system of claim 11, wherein the location of the home of the user that is associated with the media overlay can only be changed after a specified time period.

20. A non-transitory computer-readable medium comprising instructions stored thereon that are executable by at least one processor to cause a computing device to perform operations comprising:

receiving a request to generate a media overlay corresponding to a home of a first user, the request comprising media content to be included in the media overlay;

generating the media overlay corresponding to the home of the first user, using the received media content;

determining a location of the home of the first user;

receiving a selection of users to whom to grant permission to access the media overlay corresponding to the home of the first user;

associating the location of the home of the first user and the selection of users with the media overlay;

storing the media overlay and associated location of the home of the first user and selection of users;

receiving location information corresponding to a location of a second computing device;

determining a second user corresponding to the second computing device;

determining whether the second user and the location information corresponding to the second computing device trigger access to the media overlay; and providing the media overlay to the second computing device, based on determining that the second user and the location information corresponding to the second computing device trigger access to the media overlay.

* * * * *

UNITED STATES PATENT AND TRADEMARK OFFICE
CERTIFICATE OF CORRECTION

PATENT NO. : 10,838,599 B2
APPLICATION NO. : 16/798111
DATED : November 17, 2020
INVENTOR(S) : Barkman et al.

Page 1 of 1

It is certified that error appears in the above-identified patent and that said Letters Patent is hereby corrected as shown below:

In the Claims

In Column 23, Line 31, in Claim 1, delete "system" and insert --system,-- therefor Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*